(12) United States Patent
Mordani et al.

(10) Patent No.: US 11,343,200 B2
(45) Date of Patent: **\*May 24, 2022**

(54) SYSTEM AND METHOD FOR SUPPORTING MULTI-TENANCY IN AN APPLICATION SERVER, CLOUD, OR OTHER ENVIRONMENT

(71) Applicant: ORACLE INTERNATIONAL CORPORATION, Redwood Shores, CA (US)

(72) Inventors: Rajiv Mordani, Sunnyvale, CA (US); Nazrul Islam, Santa Clara, CA (US); Abhijit Kumar, Cupertino, CA (US); Timothy Quinn, Lake Forest, IL (US); Peter Bower, Watchung, NJ (US); Lawrence Feigen, Watchung, NJ (US); Joseph DiPol, Sunnyvale, CA (US)

(73) Assignee: ORACLE INTERNATIONAL CORPORATION, Redwood Shores, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/918,631

(22) Filed: Jul. 1, 2020

(65) Prior Publication Data
US 2020/0336437 A1 Oct. 22, 2020

Related U.S. Application Data

(63) Continuation of application No. 15/948,721, filed on Apr. 9, 2018, now Pat. No. 10,742,568, which is a
(Continued)

(51) Int. Cl.
*H04L 12/911* (2013.01)
*H04L 29/08* (2006.01)
(Continued)

(52) U.S. Cl.
CPC ............... *H04L 47/78* (2013.01); *G06F 8/60* (2013.01); *G06F 9/4451* (2013.01); *H04L 67/10* (2013.01)

(58) Field of Classification Search
None
See application file for complete search history.

(56) References Cited

U.S. PATENT DOCUMENTS

| 5,838,916 A | 11/1998 | Domenikos et al. |
| 5,983,225 A | 11/1999 | Anfindsen |

(Continued)

FOREIGN PATENT DOCUMENTS

| CN | 1534478 | 10/2004 |
| CN | 1952898 | 4/2007 |

(Continued)

OTHER PUBLICATIONS

Kuhn, Darl; "Pro Oracle Database 12c Administration; Chapter 23: Pluggable Databases", Jul. 3, 2013, pp. 667-697, 30 pages.
(Continued)

*Primary Examiner* — Qing Chen
(74) *Attorney, Agent, or Firm* — Tucker Ellis LLP

(57) ABSTRACT

In accordance with an embodiment, described herein is a system and method for supporting multi-tenancy in an application server, cloud, on-premise, or other environment, which enables categories of components and configurations to be associated with particular application instances or partitions. Resource group templates define, at a domain level, collections of deployable resources that can be referenced from resource groups. Each resource group is a named, fully-qualified collection of deployable resources that can reference a resource group template. A partition provides an administrative and runtime subdivision of the domain, and contains one or more resource groups. Each
(Continued)

resource group can reference a resource group template, to bind deployable resources to partition-specific values, for use by the referencing partition. A tenant of the application server or cloud environment can be associated with a partition, or applications deployed therein, for use by that tenant.

15 Claims, 8 Drawing Sheets

Related U.S. Application Data continuation of application No. 14/601,883, filed on Jan. 21, 2015, now Pat. No. 9,961,011.

(60) Provisional application No. 61/929,888, filed on Jan. 21, 2014, provisional application No. 62/015,966, filed on Jun. 23, 2014.

(51) Int. Cl.
*G06F 8/60* (2018.01)
*G06F 9/445* (2018.01)
*H04L 47/78* (2022.01)
*H04L 67/10* (2022.01)

(56) References Cited

U.S. PATENT DOCUMENTS

| | | | |
|---|---|---|---|
| 6,052,695 A | 4/2000 | Abe et al. |
| 6,247,109 B1 | 6/2001 | Kleinsorge et al. |
| 6,272,675 B1 | 8/2001 | Schrab et al. |
| 6,275,843 B1 | 8/2001 | Chorn |
| 6,542,926 B2 | 4/2003 | Zalewski et al. |
| 6,578,041 B1 | 6/2003 | Lomet |
| 6,625,601 B1 | 9/2003 | Molloy |
| 6,725,317 B1 | 4/2004 | Bouchier et al. |
| 6,845,503 B1 | 1/2005 | Carlson et al. |
| 6,922,685 B2 | 7/2005 | Greene et al. |
| 6,931,638 B2 | 8/2005 | Daynes et al. |
| 6,959,370 B2 | 10/2005 | Shaw et al. |
| 6,980,980 B1 | 12/2005 | Yeh |
| 7,003,768 B2 | 2/2006 | Daynes et al. |
| 7,065,755 B2 | 6/2006 | Daynes et al. |
| 7,082,432 B2 | 7/2006 | Bhogi et al. |
| 7,165,255 B2 | 1/2007 | Czajkowski et al. |
| 7,228,455 B2 | 6/2007 | Pavlik et al. |
| 7,266,816 B1 | 9/2007 | Sharma et al. |
| 7,289,964 B1 | 10/2007 | Bowman-Amuah |
| 7,290,056 B1 | 10/2007 | McLaughlin, Jr. |
| 7,454,448 B1 | 11/2008 | Daynes et al. |
| 7,478,099 B1 | 1/2009 | Gandhi et al. |
| 7,519,181 B2 | 4/2009 | Shaheen et al. |
| 7,539,746 B2 | 5/2009 | Bankier et al. |
| 7,590,724 B1 | 9/2009 | Williams |
| 7,590,984 B2 | 9/2009 | Kaufman et al. |
| 7,627,621 B2 | 12/2009 | Daynes et al. |
| 7,631,107 B2 | 12/2009 | Pandya |
| 7,660,824 B2 | 2/2010 | Halpern et al. |
| 7,685,131 B2 | 3/2010 | Batra et al. |
| 7,698,698 B2 | 4/2010 | Lai |
| 7,702,649 B1 | 4/2010 | Bresch et al. |
| 7,725,559 B2 | 5/2010 | Landis et al. |
| 7,756,912 B2 | 7/2010 | Daynes et al. |
| 7,765,187 B2 | 7/2010 | Bergant et al. |
| 7,797,306 B1 | 9/2010 | Pather et al. |
| 7,844,851 B2 | 11/2010 | Cosmadopoulos et al. |
| 7,870,171 B2 | 1/2011 | Daynes et al. |
| 7,895,475 B2 | 2/2011 | Kulkarni et al. |
| 7,926,060 B2 | 4/2011 | Klingman |
| 7,930,427 B2 | 4/2011 | Josefberg et al. |
| 7,941,804 B1 | 5/2011 | Herington et al. |
| 8,069,447 B2 | 11/2011 | Jacobs et al. |
| 8,078,704 B2 | 12/2011 | Lee |
| 8,078,737 B2 | 12/2011 | Cosmadopoulos et al. |
| 8,117,153 B2 | 2/2012 | Cattell et al. |
| 8,166,152 B1 | 4/2012 | Delcheva et al. |
| 8,234,650 B1 | 7/2012 | Eppstein et al. |
| 8,250,559 B2 | 8/2012 | Daynes et al. |
| 8,266,616 B1 | 9/2012 | Jacquot et al. |
| 8,326,876 B1 | 12/2012 | Venkataraman et al. |
| 8,352,608 B1 | 1/2013 | Keagy et al. |
| 8,392,564 B1 | 3/2013 | Czajkowski et al. |
| 8,402,525 B1 | 3/2013 | Shah et al. |
| 8,458,717 B1 | 6/2013 | Keagy et al. |
| 8,495,067 B2 | 7/2013 | Ripberger |
| 8,560,699 B1 | 10/2013 | Theimer et al. |
| 8,601,473 B1 | 12/2013 | Aron et al. |
| 8,621,178 B1 | 12/2013 | Lazar |
| 8,650,299 B1 | 2/2014 | Huang et al. |
| 8,656,386 B1 | 2/2014 | Baimetov et al. |
| 8,671,404 B2 | 3/2014 | DeHaan et al. |
| 8,688,923 B2 | 4/2014 | Jacobs et al. |
| 8,713,295 B2 | 4/2014 | Bax et al. |
| 8,743,872 B2 | 6/2014 | Chidambaram et al. |
| 8,776,050 B2 | 7/2014 | Plouffe et al. |
| 8,782,762 B2 | 7/2014 | Krishnan et al. |
| 8,813,225 B1 | 8/2014 | Fuller et al. |
| 8,839,426 B1 | 9/2014 | Brueckner et al. |
| 8,892,509 B2 | 11/2014 | Cattell et al. |
| 8,898,668 B1 | 11/2014 | Costea et al. |
| 8,898,800 B1 | 11/2014 | Fredinburg et al. |
| 8,904,549 B2 | 12/2014 | Mogaki |
| 8,935,427 B2 | 1/2015 | Outhred et al. |
| 8,954,588 B1 | 2/2015 | Bertz et al. |
| 8,959,523 B2 | 2/2015 | Patil et al. |
| 8,966,464 B1 | 2/2015 | Christopher et al. |
| 8,977,848 B1 | 3/2015 | Tomlinson et al. |
| 9,009,116 B2 | 4/2015 | Cattell et al. |
| 9,154,366 B1 | 10/2015 | Martin et al. |
| 9,197,417 B2 | 11/2015 | Ghanaie-Sichanie et al. |
| 9,271,142 B1 | 2/2016 | Broch et al. |
| 9,274,811 B1 | 3/2016 | Reeves et al. |
| 9,317,706 B2 | 4/2016 | Kaushik et al. |
| 9,325,585 B1 | 4/2016 | Wang et al. |
| 9,338,046 B2 | 5/2016 | Bose et al. |
| 9,442,708 B1 | 9/2016 | Reeves |
| 9,507,587 B2 | 11/2016 | Kirchgaessner et al. |
| 9,524,186 B2 | 12/2016 | Shen et al. |
| 9,600,500 B1 | 3/2017 | Gupta et al. |
| 9,660,500 B2 | 3/2017 | Gupta et al. |
| 9,621,668 B2 | 4/2017 | Kamath et al. |
| 9,667,430 B2 | 5/2017 | Connelly |
| 9,667,703 B1 | 5/2017 | Vetter et al. |
| 9,774,401 B1 | 9/2017 | Borrill |
| 9,799,017 B1 | 10/2017 | Wang et al. |
| 9,930,129 B2 | 3/2018 | Felts et al. |
| 10,007,691 B2 | 6/2018 | Gleeson et al. |
| 10,009,425 B1 | 6/2018 | Shavell et al. |
| 10,009,426 B2 | 6/2018 | Shavell et al. |
| 10,103,946 B2 | 10/2018 | Xiao et al. |
| 10,187,454 B2 | 1/2019 | Sengodan et al. |
| 10,339,127 B2 | 7/2019 | Colrain et al. |
| 10,439,953 B2 | 10/2019 | Patel et al. |
| 10,474,998 B2 | 11/2019 | Xiao et al. |
| 10,476,938 B2 | 11/2019 | Barnes et al. |
| 2001/0047276 A1 | 11/2001 | Eisenhart |
| 2002/0002635 A1 | 1/2002 | Astala et al. |
| 2002/0016892 A1 | 2/2002 | Zalewski et al. |
| 2002/0059427 A1 | 5/2002 | Tamaki et al. |
| 2002/0066033 A1 | 5/2002 | Dobbins et al. |
| 2002/0083078 A1 | 6/2002 | Pardon et al. |
| 2002/0087366 A1 | 7/2002 | Collier et al. |
| 2002/0087687 A1 | 7/2002 | Zaifman et al. |
| 2002/0147696 A1 | 10/2002 | Acker et al. |
| 2002/0184312 A1 | 12/2002 | Chen et al. |
| 2002/0188538 A1 | 12/2002 | Robertson et al. |
| 2003/0036919 A1 | 2/2003 | Felt et al. |
| 2003/0046114 A1 | 3/2003 | Davies et al. |
| 2003/0046342 A1 | 3/2003 | Felt et al. |
| 2003/0050932 A1 | 3/2003 | Pace et al. |
| 2003/0084056 A1 | 5/2003 | DeAnna et al. |
| 2003/0105768 A1 | 6/2003 | Berkowitz et al. |

(56) References Cited

U.S. PATENT DOCUMENTS

| | | |
|---|---|---|
| 2003/0172145 A1 | 9/2003 | Nguyen |
| 2003/0220993 A1 | 11/2003 | Blizniak et al. |
| 2003/0229623 A1 | 12/2003 | Chang et al. |
| 2004/0015578 A1 | 1/2004 | Karakashian et al. |
| 2004/0015600 A1 | 1/2004 | Tiwary et al. |
| 2004/0015859 A1 | 1/2004 | Potter et al. |
| 2004/0030627 A1 | 2/2004 | Sedukhin |
| 2004/0039798 A1 | 2/2004 | Hotz et al. |
| 2004/0068501 A1 | 4/2004 | McGoveran |
| 2004/0068560 A1 | 4/2004 | Oulu et al. |
| 2004/0148569 A1 | 7/2004 | Sengodan |
| 2004/0194066 A1 | 9/2004 | Frey et al. |
| 2004/0215725 A1 | 10/2004 | Love et al. |
| 2004/0216109 A1 | 10/2004 | Bhogi et al. |
| 2004/0220933 A1 | 11/2004 | Walker |
| 2004/0225915 A1 | 11/2004 | Johnson et al. |
| 2004/0255264 A1 | 12/2004 | Simpson |
| 2004/0255298 A1 | 12/2004 | Dorrance et al. |
| 2005/0005200 A1 | 1/2005 | Matena et al. |
| 2005/0015353 A1 | 1/2005 | Kumar et al. |
| 2005/0022006 A1 | 1/2005 | Bass et al. |
| 2005/0283658 A1 | 1/2005 | Clark et al. |
| 2005/0120160 A1 | 6/2005 | Plouffe et al. |
| 2005/0125445 A1 | 6/2005 | Cotner et al. |
| 2005/0160434 A1 | 7/2005 | Tan et al. |
| 2005/0177827 A1 | 8/2005 | Fong et al. |
| 2005/0216421 A1 | 9/2005 | Barry et al. |
| 2005/0216585 A1 | 9/2005 | Todorova et al. |
| 2005/0216860 A1 | 9/2005 | Petrov et al. |
| 2005/0234867 A1 | 10/2005 | Shinkai |
| 2005/0262077 A1 | 11/2005 | Barnes et al. |
| 2005/0262507 A1 | 11/2005 | Langen et al. |
| 2005/0271051 A1 | 12/2005 | Holloway et al. |
| 2005/0273456 A1 | 12/2005 | Revanuru et al. |
| 2005/0273490 A1 | 12/2005 | Shrivastava et al. |
| 2005/0273518 A1 | 12/2005 | Patrick et al. |
| 2005/0273667 A1 | 12/2005 | Shrivastava et al. |
| 2005/0273787 A1 | 12/2005 | Kovachka-Dimitrova et al. |
| 2006/0015839 A1 | 1/2006 | Owens et al. |
| 2006/0015881 A1 | 1/2006 | Polozoff |
| 2006/0036448 A1 | 2/2006 | Haynie et al. |
| 2006/0036715 A1 | 2/2006 | Ghattu |
| 2006/0036734 A1 | 2/2006 | Breeden et al. |
| 2006/0036747 A1 | 2/2006 | Galvin, Jr. et al. |
| 2006/0069791 A1 | 3/2006 | Patrick et al. |
| 2006/0075277 A1 | 4/2006 | Johnson et al. |
| 2006/0106748 A1 | 5/2006 | Chafle et al. |
| 2006/0111880 A1 | 5/2006 | Brown et al. |
| 2006/0168169 A1 | 7/2006 | Finan et al. |
| 2006/0174224 A1 | 8/2006 | Parkinson et al. |
| 2006/0179125 A1 | 8/2006 | Pavlik et al. |
| 2006/0190504 A1 | 8/2006 | Pruet, III |
| 2006/0195619 A1 | 8/2006 | Arndt et al. |
| 2006/0200800 A1 | 9/2006 | Melby |
| 2006/0206887 A1 | 9/2006 | Dodge et al. |
| 2006/0218521 A1 | 9/2006 | Hagstrom et al. |
| 2007/0006203 A1 | 1/2007 | Marwinski |
| 2007/0022203 A1 | 1/2007 | Haberkorn et al. |
| 2007/0043784 A1 | 2/2007 | Parkinson |
| 2007/0044144 A1 | 2/2007 | Knouse et al. |
| 2007/0067266 A1 | 3/2007 | Lomet |
| 2007/0067435 A1 | 3/2007 | Landis et al. |
| 2007/0143261 A1 | 6/2007 | Uppala |
| 2007/0143299 A1 | 6/2007 | Huras et al. |
| 2007/0143339 A1 | 6/2007 | Springett |
| 2007/0156808 A1 | 7/2007 | Koegel et al. |
| 2007/0162720 A1 | 7/2007 | Branda et al. |
| 2007/0168371 A1 | 7/2007 | Bhogal et al. |
| 2007/0198681 A1 | 8/2007 | Bakke et al. |
| 2007/0208862 A1 | 9/2007 | Fox et al. |
| 2007/0220302 A1 | 9/2007 | Cline et al. |
| 2007/0226218 A1 | 9/2007 | Chatterjee et al. |
| 2007/0240127 A1 | 10/2007 | Roques et al. |
| 2007/0245331 A1 | 10/2007 | Daynes et al. |
| 2007/0261054 A1 | 11/2007 | Chesebro et al. |
| 2007/0282879 A1 | 12/2007 | Degenkolb et al. |
| 2008/0010287 A1 | 1/2008 | Hinton et al. |
| 2008/0010288 A1 | 1/2008 | Hinton et al. |
| 2008/0071922 A1 | 3/2008 | Chetuparambil et al. |
| 2008/0091808 A1 | 4/2008 | Mei et al. |
| 2008/0127076 A1 | 5/2008 | Mcardle |
| 2008/0148254 A1 | 6/2008 | Hofer et al. |
| 2008/0155350 A1 | 6/2008 | Ivanov et al. |
| 2008/0165762 A1 | 7/2008 | Gilfix et al. |
| 2008/0177976 A1 | 7/2008 | Branda et al. |
| 2008/0196029 A1 | 8/2008 | Doty et al. |
| 2008/0235295 A1 | 9/2008 | Parkinson |
| 2008/0250074 A1 | 10/2008 | Parkinson |
| 2008/0301627 A1 | 12/2008 | Stark |
| 2008/0320269 A1 | 12/2008 | Houlihan et al. |
| 2009/0007097 A1 | 1/2009 | Hinton et al. |
| 2009/0019439 A1 | 1/2009 | Kwon et al. |
| 2009/0024851 A1 | 1/2009 | Andrade |
| 2009/0037452 A1 | 2/2009 | Baitalmal et al. |
| 2009/0037492 A1 | 2/2009 | Baitalmal et al. |
| 2009/0037952 A1 | 2/2009 | Hong |
| 2009/0055831 A1 | 2/2009 | Bauman et al. |
| 2009/0077135 A1 | 3/2009 | Yalamanchi et al. |
| 2009/0089410 A1 | 4/2009 | Vincente |
| 2009/0094073 A1 | 4/2009 | Cheung et al. |
| 2009/0116380 A1 | 5/2009 | Santiago et al. |
| 2009/0118839 A1 | 5/2009 | Accapadi et al. |
| 2009/0125612 A1 | 5/2009 | Rabetge et al. |
| 2009/0132692 A1 | 5/2009 | Ansari et al. |
| 2009/0182787 A1 | 7/2009 | Parkinson |
| 2009/0183168 A1 | 7/2009 | Uchida |
| 2009/0222823 A1 | 9/2009 | Parkinson et al. |
| 2009/0259999 A1 | 10/2009 | Srinivasan |
| 2009/0271696 A1 | 10/2009 | Bailor et al. |
| 2009/0275314 A1 | 11/2009 | Cotevino et al. |
| 2009/0276771 A1 | 11/2009 | Nickolov et al. |
| 2009/0276783 A1 | 11/2009 | Johnsen et al. |
| 2009/0300023 A1 | 12/2009 | Vaghani |
| 2009/0300093 A1 | 12/2009 | Griffiths et al. |
| 2009/0307743 A1 | 12/2009 | Azagury et al. |
| 2009/0320045 A1 | 12/2009 | Griffith et al. |
| 2010/0023937 A1 | 1/2010 | Kothari et al. |
| 2010/0030995 A1 | 2/2010 | Wang et al. |
| 2010/0049959 A1 | 2/2010 | Arcese et al. |
| 2010/0080241 A1 | 4/2010 | Cosmadopoulos et al. |
| 2010/0106842 A1 | 4/2010 | Cosmadopoulos et al. |
| 2010/0138696 A1 | 6/2010 | Dehaan et al. |
| 2010/0169289 A1 | 7/2010 | Newport et al. |
| 2010/0176962 A1 | 7/2010 | Yossef |
| 2010/0185963 A1 | 7/2010 | Slik et al. |
| 2010/0191843 A1 | 7/2010 | Bohm |
| 2010/0251002 A1 | 9/2010 | Sivasubramanian et al. |
| 2010/0274910 A1 | 10/2010 | Ghanaie-Sichanie et al. |
| 2010/0325624 A1 | 12/2010 | Bartolo et al. |
| 2010/0333060 A1 | 12/2010 | Kirchgaessner et al. |
| 2011/0022694 A1 | 1/2011 | Dalal et al. |
| 2011/0035356 A1 | 2/2011 | Vukojevic |
| 2011/0041006 A1 | 2/2011 | Fowler |
| 2011/0047453 A1 | 2/2011 | Catalahana et al. |
| 2011/0093435 A1 | 4/2011 | Zha et al. |
| 2011/0093469 A1 | 4/2011 | B'Far et al. |
| 2011/0125979 A1 | 5/2011 | Kancharla et al. |
| 2011/0137953 A1 | 6/2011 | Bobick et al. |
| 2011/0138374 A1 | 6/2011 | Pal |
| 2011/0145204 A1 | 6/2011 | Maple et al. |
| 2011/0145794 A1 | 6/2011 | Gerginov et al. |
| 2011/0161949 A1 | 6/2011 | Kodaka |
| 2011/0185064 A1 | 7/2011 | Head et al. |
| 2011/0213829 A1 | 9/2011 | Concini et al. |
| 2011/0213870 A1 | 9/2011 | Cai et al. |
| 2011/0225275 A1 | 9/2011 | Shah et al. |
| 2011/0225298 A1 | 9/2011 | Brown et al. |
| 2011/0238630 A1 | 9/2011 | Nishigaki |
| 2011/0238795 A1 | 9/2011 | Bauer et al. |
| 2011/0265147 A1 | 10/2011 | Liu |
| 2011/0265168 A1 | 10/2011 | Lucovsky et al. |
| 2011/0271005 A1 | 11/2011 | Bharrat et al. |
| 2011/0289509 A1 | 11/2011 | Kothari et al. |
| 2011/0307450 A1 | 12/2011 | Hahn et al. |

(56) References Cited

U.S. PATENT DOCUMENTS

| | | |
|---|---|---|
| 2011/0314447 A1 | 12/2011 | Malyshev et al. |
| 2011/0320520 A1 | 12/2011 | Jain |
| 2012/0030168 A1 | 2/2012 | Weissenberger et al. |
| 2012/0042198 A1 | 2/2012 | Han et al. |
| 2012/0047239 A1 | 2/2012 | Donahue et al. |
| 2012/0054720 A1 | 3/2012 | Klein et al. |
| 2012/0054732 A1 | 3/2012 | Jain et al. |
| 2012/0072597 A1 | 3/2012 | Teather et al. |
| 2012/0072893 A1 | 3/2012 | Gupta et al. |
| 2012/0096521 A1 | 4/2012 | Peddada |
| 2012/0102006 A1 | 4/2012 | Larson et al. |
| 2012/0102480 A1 | 4/2012 | Hopmann et al. |
| 2012/0110566 A1 | 5/2012 | Park |
| 2012/0110574 A1 | 5/2012 | Kumar |
| 2012/0124353 A1 | 5/2012 | Rehman |
| 2012/0131101 A1 | 5/2012 | Said et al. |
| 2012/0144044 A1 | 6/2012 | Verma |
| 2012/0147894 A1 | 6/2012 | Mulligan et al. |
| 2012/0150912 A1 | 6/2012 | Ripberger |
| 2012/0166488 A1 | 6/2012 | Kaushik et al. |
| 2012/0167081 A1 | 6/2012 | Sedayao et al. |
| 2012/0167094 A1 | 6/2012 | Suit |
| 2012/0173581 A1 | 7/2012 | Hartig et al. |
| 2012/0179645 A1 | 7/2012 | Lomet et al. |
| 2012/0179646 A1 | 7/2012 | Hinton et al. |
| 2012/0215775 A1 | 8/2012 | Allen et al. |
| 2012/0221694 A1 | 8/2012 | Darcy |
| 2012/0254266 A1 | 10/2012 | Printezis et al. |
| 2012/0254331 A1 | 10/2012 | Chuan et al. |
| 2012/0254445 A1 | 10/2012 | Kawamoto et al. |
| 2012/0296883 A1 | 11/2012 | Ganesh et al. |
| 2012/0324069 A1 | 12/2012 | Nori et al. |
| 2013/0007891 A1 | 1/2013 | Mogaki |
| 2013/0019253 A1 | 1/2013 | Joseph et al. |
| 2013/0024863 A1 | 1/2013 | Parkinson et al. |
| 2013/0031403 A1 | 1/2013 | Mordani et al. |
| 2013/0036400 A1 | 2/2013 | Bak et al. |
| 2013/0066837 A1 | 3/2013 | Colrain et al. |
| 2013/0066948 A1 | 3/2013 | Colrain et al. |
| 2013/0066949 A1 | 3/2013 | Colrain et al. |
| 2013/0066952 A1 | 3/2013 | Colrain et al. |
| 2013/0085996 A1 | 4/2013 | Tian et al. |
| 2013/0086235 A1 | 4/2013 | Ferris |
| 2013/0103639 A1 | 4/2013 | Greenberg et al. |
| 2013/0103654 A1 | 4/2013 | McLachlan et al. |
| 2013/0103938 A1 | 4/2013 | Datta et al. |
| 2013/0104150 A1 | 4/2013 | Rdzak et al. |
| 2013/0117289 A1 | 5/2013 | Fischer et al. |
| 2013/0132458 A1 | 5/2013 | Little |
| 2013/0145367 A1 | 6/2013 | Moss et al. |
| 2013/0151680 A1 | 6/2013 | Salinas et al. |
| 2013/0151683 A1 | 6/2013 | Jain et al. |
| 2013/0160115 A1 | 6/2013 | Venkataramanappa et al. |
| 2013/0179880 A1 | 7/2013 | Edholm et al. |
| 2013/0191924 A1 | 7/2013 | Tedesco et al. |
| 2013/0204917 A1 | 8/2013 | Wang et al. |
| 2013/0212279 A1 | 8/2013 | Dutta et al. |
| 2013/0212576 A1 | 8/2013 | Huang et al. |
| 2013/0226985 A1 | 8/2013 | Dixon et al. |
| 2013/0232191 A1 | 9/2013 | Cheng et al. |
| 2013/0232497 A1 | 9/2013 | Jalagam et al. |
| 2013/0232498 A1 | 9/2013 | Mangtani et al. |
| 2013/0246368 A1 | 9/2013 | Parkinson et al. |
| 2013/0246379 A1 | 9/2013 | Shen et al. |
| 2013/0246554 A1 | 9/2013 | Lv et al. |
| 2013/0246845 A1 | 9/2013 | Parkinson |
| 2013/0246875 A1 | 9/2013 | Ryan et al. |
| 2013/0254758 A1 | 9/2013 | Walter et al. |
| 2013/0262689 A1 | 10/2013 | Schmidt et al. |
| 2013/0263123 A1 | 10/2013 | Zhou et al. |
| 2013/0268920 A1 | 10/2013 | Ursal et al. |
| 2013/0275819 A1 | 10/2013 | Banerjee et al. |
| 2013/0290524 A1 | 10/2013 | Liu et al. |
| 2013/0290960 A1 | 10/2013 | Astete et al. |
| 2013/0295976 A1 | 10/2013 | Dawson et al. |
| 2013/0297801 A1 | 11/2013 | Guest et al. |
| 2013/0304714 A1 | 11/2013 | Lee et al. |
| 2013/0304788 A1 | 11/2013 | DeLuca et al. |
| 2013/0326506 A1 | 12/2013 | McGrath et al. |
| 2013/0326507 A1 | 12/2013 | McGrath et al. |
| 2013/0332577 A1 | 12/2013 | Nakil et al. |
| 2013/0339400 A1 | 12/2013 | Pflughoeft |
| 2013/0339470 A1 | 12/2013 | Jeswani et al. |
| 2013/0346380 A1 | 12/2013 | Dong et al. |
| 2013/0346967 A1 | 12/2013 | Anand et al. |
| 2014/0006626 A1 | 1/2014 | Breiter et al. |
| 2014/0013325 A1 | 1/2014 | Shimoni et al. |
| 2014/0033268 A1 | 1/2014 | Julisch et al. |
| 2014/0047150 A1 | 2/2014 | Marietta et al. |
| 2014/0047439 A1 | 2/2014 | Levy et al. |
| 2014/0068207 A1 | 3/2014 | Aslot et al. |
| 2014/0068568 A1 | 3/2014 | Wisnovsky |
| 2014/0075019 A1 | 3/2014 | Mordani et al. |
| 2014/0075021 A1 | 3/2014 | Revanuru |
| 2014/0075029 A1 | 3/2014 | Lipchuk et al. |
| 2014/0075030 A1 | 3/2014 | Wang et al. |
| 2014/0075032 A1 | 3/2014 | Vasudevan et al. |
| 2014/0075501 A1 | 3/2014 | Srinivasan et al. |
| 2014/0075520 A1 | 3/2014 | Subramanian et al. |
| 2014/0075565 A1 | 3/2014 | Srinivasan et al. |
| 2014/0082470 A1 | 3/2014 | Trebas et al. |
| 2014/0089928 A1 | 3/2014 | Stern et al. |
| 2014/0095589 A1 | 4/2014 | Johnson |
| 2014/0107855 A1 | 4/2014 | Zhang |
| 2014/0123316 A1 | 5/2014 | Leggette et al. |
| 2014/0136688 A1 | 5/2014 | Kopri et al. |
| 2014/0143276 A1 | 5/2014 | Rogers et al. |
| 2014/0149361 A1 | 5/2014 | Hosey |
| 2014/0149483 A1 | 5/2014 | Mitchell et al. |
| 2014/0149980 A1 | 5/2014 | Vittal et al. |
| 2014/0149983 A1 | 5/2014 | Bonilla et al. |
| 2014/0157276 A1 | 6/2014 | Smithson |
| 2014/0164933 A1 | 6/2014 | Eberlein et al. |
| 2014/0189681 A1 | 7/2014 | Bryan et al. |
| 2014/0201242 A1 | 7/2014 | Bakthavachalam et al. |
| 2014/0244585 A1 | 8/2014 | Sivasubramanian et al. |
| 2014/0245275 A1 | 8/2014 | Elias et al. |
| 2014/0250436 A1 | 9/2014 | Tang et al. |
| 2014/0278641 A1 | 9/2014 | Kleehammer et al. |
| 2014/0279899 A1 | 9/2014 | Gu et al. |
| 2014/0280306 A1 | 9/2014 | Juillard |
| 2014/0280595 A1 | 9/2014 | Mani et al. |
| 2014/0280975 A1 | 9/2014 | Mordani et al. |
| 2014/0282519 A1 | 9/2014 | Apte et al. |
| 2014/0297780 A1 | 10/2014 | Zhou et al. |
| 2014/0297868 A1 | 10/2014 | Ennaji et al. |
| 2014/0304299 A1 | 10/2014 | Yan et al. |
| 2014/0310287 A1 | 10/2014 | Bruso et al. |
| 2014/0330767 A1 | 11/2014 | Fowler |
| 2014/0331297 A1 | 11/2014 | Innes et al. |
| 2014/0344395 A1 | 11/2014 | Alexander |
| 2014/0359113 A1 | 12/2014 | Krebs et al. |
| 2014/0359126 A1 | 12/2014 | Breternitz et al. |
| 2014/0359552 A1 | 12/2014 | Misra et al. |
| 2015/0006650 A1 | 1/2015 | Basavanna et al. |
| 2015/0032884 A1 | 1/2015 | Greifeneder et al. |
| 2015/0089031 A1 | 3/2015 | Kalali |
| 2015/0089068 A1 | 3/2015 | Islam et al. |
| 2015/0089274 A1 | 3/2015 | Mares et al. |
| 2015/0095917 A1 | 4/2015 | Challenger et al. |
| 2015/0096011 A1 | 4/2015 | Watt |
| 2015/0106521 A1 | 4/2015 | Cao et al. |
| 2015/0128147 A1 | 5/2015 | Holt |
| 2015/0193251 A1 | 7/2015 | Chu et al. |
| 2015/0207758 A1 | 7/2015 | Mordani et al. |
| 2015/0212850 A1 | 7/2015 | Little |
| 2015/0234682 A1 | 8/2015 | Dageville et al. |
| 2015/0277856 A1 | 10/2015 | Payne et al. |
| 2015/0277974 A1 | 10/2015 | Beale |
| 2015/0295844 A1 | 10/2015 | Perreira et al. |
| 2015/0296030 A1 | 10/2015 | Maes et al. |
| 2015/0304389 A1 | 10/2015 | Chiussi et al. |
| 2015/0309889 A1 | 10/2015 | Campbell et al. |
| 2015/0319265 A1 | 11/2015 | DeRoo et al. |

(56) References Cited

U.S. PATENT DOCUMENTS

| | | |
|---|---|---|
| 2015/0365275 A1 | 12/2015 | Iliev et al. |
| 2015/0370608 A1 | 12/2015 | Dipol et al. |
| 2015/0372883 A1 | 12/2015 | Lam et al. |
| 2015/0372887 A1 | 12/2015 | Inamdar et al. |
| 2015/0372936 A1 | 12/2015 | Kasso et al. |
| 2015/0372937 A1 | 12/2015 | Lai et al. |
| 2015/0372938 A1 | 12/2015 | Patel et al. |
| 2015/0372941 A1 | 12/2015 | Patel et al. |
| 2015/0373097 A1 | 12/2015 | Konkus et al. |
| 2015/0373098 A1 | 12/2015 | Mordani et al. |
| 2015/0373099 A1 | 12/2015 | Dipol et al. |
| 2015/0373117 A1 | 12/2015 | Gleyzer et al. |
| 2015/0378700 A1 | 12/2015 | Rachamadugu et al. |
| 2015/0381453 A1 | 12/2015 | Skjolsvold et al. |
| 2016/0013983 A1 | 1/2016 | Lu et al. |
| 2016/0014038 A1 | 1/2016 | Thyagarajan et al. |
| 2016/0014191 A1 | 1/2016 | Liu et al. |
| 2016/0014212 A1 | 1/2016 | Zhang et al. |
| 2016/0020949 A1 | 1/2016 | Mares et al. |
| 2016/0020965 A1 | 1/2016 | Sakata et al. |
| 2016/0057041 A1 | 2/2016 | Gupta et al. |
| 2016/0070589 A1 | 3/2016 | Vermeulen et al. |
| 2016/0085772 A1 | 3/2016 | Vermeulen et al. |
| 2016/0086260 A1 | 3/2016 | Vermeulen et al. |
| 2016/0088108 A1 | 3/2016 | Felts et al. |
| 2016/0088180 A1 | 3/2016 | Felts et al. |
| 2016/0092197 A1 | 3/2016 | Kuchibhotla et al. |
| 2016/0092278 A1 | 3/2016 | Quinn et al. |
| 2016/0092319 A1 | 3/2016 | Parkinson et al. |
| 2016/0092342 A1 | 3/2016 | Inamdar et al. |
| 2016/0094385 A1 | 3/2016 | Bower et al. |
| 2016/0094403 A1 | 3/2016 | Somogyi et al. |
| 2016/0094404 A1 | 3/2016 | Kasso et al. |
| 2016/0094405 A1 | 3/2016 | Barnes et al. |
| 2016/0094406 A1 | 3/2016 | Phan et al. |
| 2016/0094407 A1 | 3/2016 | Parkinson et al. |
| 2016/0094408 A1 | 3/2016 | Segu |
| 2016/0094473 A1 | 3/2016 | Mordani et al. |
| 2016/0094474 A1 | 3/2016 | Sahoo et al. |
| 2016/0094478 A1 | 3/2016 | Quinn et al. |
| 2016/0094484 A1 | 3/2016 | Mordani et al. |
| 2016/0094486 A1 | 3/2016 | Sahoo et al. |
| 2016/0094498 A1 | 3/2016 | Xiao et al. |
| 2016/0094510 A1 | 3/2016 | Xiao et al. |
| 2016/0094582 A1 | 3/2016 | Watson et al. |
| 2016/0094583 A1 | 3/2016 | Bower |
| 2016/0094624 A1 | 3/2016 | Mordani et al. |
| 2016/0094625 A1 | 3/2016 | Sengodan et al. |
| 2016/0094626 A1 | 3/2016 | Bajaj et al. |
| 2016/0094627 A1 | 3/2016 | Subramanyam et al. |
| 2016/0094635 A1 | 3/2016 | Kannan et al. |
| 2016/0124993 A1 | 5/2016 | Watson et al. |
| 2016/0142506 A1 | 5/2016 | Sahoo et al. |
| 2016/0210322 A1 | 7/2016 | Little |
| 2016/0231998 A1 | 8/2016 | Islam et al. |
| 2016/0285694 A1 | 9/2016 | Maes |
| 2016/0314162 A1 | 10/2016 | Tarta et al. |
| 2016/0328268 A1 | 11/2016 | Islam et al. |
| 2016/0366142 A1 | 12/2016 | Kamble |
| 2017/0017494 A1 | 1/2017 | Patel et al. |
| 2017/0019467 A1 | 1/2017 | Inamdar et al. |
| 2017/0019485 A1 | 1/2017 | Dorr et al. |
| 2017/0034071 A1 | 2/2017 | Sidde et al. |
| 2017/0116041 A1 | 4/2017 | Nanjundaswamy |
| 2017/0118137 A1 | 4/2017 | Nanjundaswamy |
| 2017/0126742 A1 | 5/2017 | Hopkins et al. |
| 2017/0192772 A1 | 7/2017 | Islam et al. |
| 2017/0220621 A1 | 8/2017 | Colrain et al. |
| 2017/0221140 A1 | 8/2017 | Melamed |
| 2018/0041382 A1 | 2/2018 | Bhat et al. |
| 2018/0115523 A1 | 4/2018 | Subbarayan et al. |
| 2019/0068536 A1 | 2/2019 | Gambino et al. |
| 2019/0068606 A1 | 2/2019 | Xiao et al. |

FOREIGN PATENT DOCUMENTS

| | | |
|---|---|---|
| CN | 101091164 | 12/2007 |
| CN | 101405729 | 4/2009 |
| CN | 101639835 | 2/2010 |
| CN | 102016834 | 4/2011 |
| CN | 102170457 | 8/2011 |
| CN | 102236762 | 11/2011 |
| CN | 102333115 | 1/2012 |
| CN | 102460393 | 5/2012 |
| CN | 102571427 | 7/2012 |
| CN | 102571821 | 7/2012 |
| CN | 102571916 | 7/2012 |
| CN | 102609271 | 7/2012 |
| CN | 102681899 | 9/2012 |
| CN | 102834822 | 12/2012 |
| CN | 102932404 | 2/2013 |
| CN | 102932405 | 2/2013 |
| CN | 103064927 | 4/2013 |
| CN | 103124967 | 5/2013 |
| CN | 103365652 | 10/2013 |
| CN | 103365683 | 10/2013 |
| CN | 103368767 | 10/2013 |
| CN | 103455512 | 12/2013 |
| CN | 103514245 | 1/2014 |
| CN | 103516777 | 1/2014 |
| CN | 103703445 | 4/2014 |
| CN | 103718533 | 4/2014 |
| CN | 103733194 | 4/2014 |
| CN | 103810444 | 5/2014 |
| CN | 103858118 | 6/2014 |
| CN | 104462389 | 3/2015 |
| EP | 0 614 139 A2 | 9/1994 |
| GB | 2510874 | 8/2014 |
| JP | H03-097030 | 4/1991 |
| JP | 2001134452 | 5/2001 |
| JP | 2003223335 | 8/2003 |
| JP | 2004503011 | 1/2004 |
| JP | 2004102379 | 4/2004 |
| JP | 2005092803 | 4/2005 |
| JP | 2005209029 | 8/2005 |
| JP | 2006511100 | 3/2006 |
| JP | 2007529079 | 10/2007 |
| JP | 2009176097 | 8/2009 |
| JP | 2009282777 | 12/2009 |
| JP | 2011232840 | 11/2011 |
| JP | 2011233146 | 11/2011 |
| JP | 2011257847 | 12/2011 |
| JP | 2012527027 | 11/2012 |
| JP | 2014096675 | 5/2014 |
| JP | 2014524608 | 9/2014 |
| KR | 10-2010-0014546 | 2/2010 |
| KR | 10-2013-0047491 | 5/2013 |
| WO | 0078004 | 12/2000 |
| WO | 2006040810 | 4/2006 |
| WO | 2008121540 | 10/2008 |
| WO | 2011162991 | 12/2011 |
| WO | 2012054160 | 4/2012 |
| WO | 2013138774 | 9/2013 |
| WO | 2014007813 | 1/2014 |
| WO | 2014039866 | 3/2014 |
| WO | 2014039892 | 3/2014 |
| WO | 2014039918 | 3/2014 |
| WO | 2014039919 | 3/2014 |
| WO | 2012063301 | 5/2014 |

OTHER PUBLICATIONS

European Patent Office, Communication pursuant to Article 94(3) EPC dated Aug. 12, 2020 for EP Application No. 15704133.6, 8 pages.

Chinese Patent Office, Office Action dated Sep. 2, 2020 for Chinese Patent Application No. 201580051392.7, 11 pages.

Chinese Patent Office, Decision to Grant dated Sep. 28, 2020 for Chinese Patent Application No. 201580033903.2, 4 pages.

Korean Patent Office, Office Action dated Oct. 20, 2020 for Korean Patent Application No. 10-2016-7022203, 6 pages.

(56) References Cited

OTHER PUBLICATIONS

United States Patent and Trademark Office, Office Action dated Oct. 20, 2020 for U.S. Appl. No. 14/748,094, 16 pages.
Indian Patent Office, First Examination Report dated Oct. 27, 2020 for Indian Patent Application No. 201647040209, 5 pages.
European Patent Office, Summons to attend oral proceedings pursuant to Rule 115(1) EPC dated Oct. 30, 2020 for EP Application No. 16770612.6, 8 pages.
Indian Patent Office, First Examination Report dated Nov. 2, 2020 for Indian Patent Application No. 201747014178, 7 pages.
United States Patent and Trademark Office, Notice of Allowance dated Nov. 12, 2020 for U.S. Appl. No. 14/866,635, 11 pages.
European Patent Office, Summons to attend oral proceedings pursuant to Rule 115(1) EPC mailed Feb. 11, 2021 for EP Application No. 15781214.0, 10 pages.
European Patent Office, Summons to attend oral proceedings pursuant to Rule 115(1) EPC mailed Feb. 11, 2021 for EP Application No. 15781215.7, 10 pages.
European Patent Office, Summons to attend oral proceedings pursuant to Rule 115(1) EPC mailed Feb. 22, 2021 for EP Application No. 15736725.1, 22 pages.
Chinese Patent Office, Office Action dated Mar. 1, 2020 for Chinese Patent Application No. 201580051282.0, 5 pages.
United States Patent and Trademark Office, Notice of Allowance dated Apr. 1, 2021 for U.S. Appl. No. 14/865,371, 18 pages.
Korean Intellectual Property Office, Office Action dated Apr. 7, 2021 for Korean Patent Application No. 10-2017-7009085, 7 pages.
Barreiros, Jorge et al., "A Cover-Based Approach for Configuration Repair", ACM 2014, pp. 157-166, 10 pages.
BEA, "BEA WebLogic Server: Configuring and Managing WebLogic JMS", Version 10.0, Mar. 30, 2007, 142 pages.
Cisco, "Designing Secure Multi-Tenancy into Virtualized Data Centers" 2009 Cisco Systems, Inc., Dec. 7, 2009, 82 pages.
Coward, Danny, Java TM Servlet Specification Version 2.4, Nov. 24, 2003, 330 pages.
Czajkowski, et al., "Multitasking without Compromise: a Virtual Machine Evolution", Sun Microsystems, OOPSLA 01 Tampa, Florida, USA, ACM, 2001, 14 pages.
D'Ambrosio, Joseph G., et al., "Configuration-Level Hardware/Software Partitioning for Real-Time Embedded Systems", 1994 IEEE, pp. 34-41, 8 pages.
Elmore, et al., Zephyr: Live Migration in Shared Nothing Databases for Elastic Cloud Platforms, Jun. 12, 2011, 12 pages.
Gil, David Sanz, "What's New in WebLogic 12c", http://www.slideshare.net/OracleMKTPR20/novedades-de-weblogic-12cdavid-sanz, Jun. 17, 2014, pp. 1-42, 42 pages.
Gracioli, et al., "CAP: Color-Aware Task Partitioning for Multicore Real-Time Applications", 2014 IEEE Emerging Technology and Factory Automation (ETFA), pp. 1-8, 8 pages.
IBM, "Websphere Application Server V6.1: System Management and Configuration", 2006, pp. 741-794, 53 pages.
"Introducing WebLogic Server 12c", Jan. 2012, Oracle, pp. 1-16, 16 pages.
Kang, Junbin et al. "MultiLanes: Providing Virtualized Storage for OS-Level Virtualization on Many Cores", 12th USENIX Conference on File and Storage Technologies (FAST '14), Feb. 17-20, 2014, Santa Clara, CA, 14 pages.
Leibert, Florian et al., "Automatic Management of Partitioned, Replicated Search Service", Copyright 2011, ACM, 8 pages.
"Oracle Enterprise Manager Concepts, 11g Release 11.1.0.1", Oracle, Apr. 2010, 260 pages.
"Oracle Multitenant", An Oracle White Paper, Jun. 2013, http://www.oracle.com/technetwork/database/multitenant-wp-12c-1949736.pdf, 53 pages.
Periasamy, "Performance Optimization in Cloud Computing Environment", Oct. 11, 2012, 6 pages.
Porter, Joseph et al., "Partition Configuration for Real-Time Systems with Dependencies", 2013, ACM, pp. 87-96, 10 pages.
Sadamori et al., "Linux operates on IBM mainframe zSeries. Overview of mainframe Linux Part 4 Realization of allocating CPU and memory flexibly by LPAR", Monthly Linux Magazine, Askey, Aug. 1, 2004, vol. 6, No. 8, pp. 94-99.
Sadtler, et al., "Websphere Application Server V6.1: System Management and Configuration", IBM, International Technical Support Organization, Nov. 2006, 990 pages.
Sase, "Complete Manual of RAC System Construction to Maximize Introduction Effects", DB Magazine Aug. 2005, vol. 15, Issue 4, pp. 93-105, 14 pages.
Sato, "Solaris 10 managed by the zone" UNIX USER, Japan, Softbank Publishing Inc., Jun. 1, 2005, vol. 14, No. 6, Consecutive number of vol. 155, pp. 48-59, 14 pages.
Shimamura, et al., "Research Developments that serve a future underlying cloud technology", NEC Technical Journal, NEC Corporation, Apr. 23, 2010, vol. 63, No. 2, pp. 114-118, 6 pages.
Sorenson, et al., "Reuse and Combination with Package Templates", ECOOP 2010, ACM, pp. 1-5, 5 pages.
Sun Microsystems, Inc., Java Naming and Directory Interface Application Programming Interface (JNDI API), Jul. 14, 1999, 76 pages.
Tatsubori, et al., "HTML Templates that Fly", WWW 2009, ACM, pp. 951-960, 10 pages.
International Search Report and Written Opinion of the International Searching Authority dated Apr. 24, 2015 for PCT Application No. PCT/US2015/012268, 10 pages.
International Search Report and Written Opinion of the International Searching Authority dated Sep. 23, 2015 for PCT Application No. PCT/US2015/037270, 9 pages.
International Search Report and Written Opinion of the International Searching Authority dated Sep. 24, 2015 for PCT Application No. PCT/US2015/037264, 11 pages.
International Search Report and Written Opinion of the International Searching Authority dated Sep. 24, 2015 for PCT Application No. PCT/US2015/037265, 10 pages.
International Search Report and Written Opinion of the International Searching Authority dated Sep. 24, 2015 for PCT Application No. PCT/US2015/037267, 13 pages.
International Search Report and Written Opinion of the International Searching Authority dated Sep. 28, 2015 for PCT Application No. PCT/US2015/037403, 12 pages.
International Search Report and Written Opinion of the International Searching Authority dated Sep. 28, 2015 for PCT Application No. PCT/US2015/040407, 10 pages.
International Search Report and Written Opinion of the International Searching Authority dated Oct. 15, 2015 for PCT Application No. PCT/US2015/037262, 13 pages.
International Search Report and Written Opinion of the International Searching Authority dated Oct. 15, 2015 for PCT Application No. PCT/US2015/040048, 12 pages.
United States Patent and Trademark Office, Office Action dated Dec. 1, 2015 for U.S. Appl. No. 14/864,695, 28 pages.
International Search Report and Written Opinion of the International Searching Authority dated Dec. 8, 2015 for PCT Application No. PCT/US2015/052057, 13 pages.
International Search Report and Written Opinion of the International Searching Authority dated Dec. 14, 2015 for PCT Application No. PCT/US2015/052471, 11 pages.
International Search Report and Written Opinion of the International Searching Authority dated Jan. 4, 2016 for PCT Application No. PCT/US2015/052459, 13 pages.
International Search Report and Written Opinion of the International Searching Authority dated Jan. 5, 2016 for PCT Application No. PCT/US2015/052462, 14 pages.
International Search Report and Written Opinion of the International Searching Authority dated Jan. 19, 2016 for PCT Application No. PCT/US2015/052469, 14 pages.
United States Patent and Trademark Office, Third-Party Submission under 37 C.F.R. 1.290 Concise Description of Relevance dated Apr. 22, 2016 for U.S. Appl. No. 14/866,644, 9 pages.
United States Patent and Trademark Office, Office Action dated Jul. 5, 2016 for U.S. Appl. No. 14/748,142, 12 pages.
United States Patent and Trademark Office, Office Action dated Aug. 25, 2016 for U.S. Appl. No. 14/747,718, 28 pages.

(56) References Cited

OTHER PUBLICATIONS

United States Patent and Trademark Office, Office Action dated Aug. 26, 2016 for U.S. Appl. No. 14/860,348, 7 pages.
United States Patent and Trademark Office, Office Action dated Oct. 5, 2016 for U.S. Appl. No. 14/865,896, 11 pages.
United States Patent and Trademark Office, Notice of Allowance dated Oct. 11, 2016 for U.S. Appl. No. 14/747,778, 21 pages.
International Search Report and Written Opinion of the International Searching Authority dated Nov. 29, 2016 for PCT Application No. PCT/US2016/051099, 12 pages.
United States Patent and Trademark Office, Office Action dated Dec. 16, 2016 for U.S. Appl. No. 14/748,148, 12 pages.
United States Patent and Trademark Office, Office Action dated Dec. 22, 2016 for U.S. Appl. No. 14/866,591, 12 pages.
United States Patent and Trademark Office, Office Action dated Dec. 30, 2016 for U.S. Appl. No. 14/860,348, 9 pages.
Jia, et al., "Research on Multi-tenant PaaS Cloud Security on Java Platform", 2013 International Conference on Information Science and Cloud Computing Companion, pp. 260-266, 7 pages.
Wikipedia, "Application server", retrieved from https://en.wikipedia.org/w/index.php?title=Application_server&oldid=584863280 on Mar. 5, 2021, 4 pages.
Chinese Patent Office, Office Action dated Dec. 30, 2020 for Chinese Patent Application No. 201580051392.7, 3 pages.
United States Patent and Trademark Office, Notice of Allowance dated Mar. 3, 2021 for U.S. Appl. No. 14/866,631, 10 pages.
European Patent Office, Communication pursuant to Article 94(3) EPC dated Mar. 12, 2021 for EP Application No. 15704133.6, 8 pages.
United States Patent and Trademark Office, Notice of Allowance dated Jul. 14, 2021 for U.S. Appl. No. 14/865,371, 21 pages.
United States Patent and Trademark Office, Office Action dated Jul. 14, 2021 for U.S. Appl. No. 16/862,097, 10 pages.
Japanese Patent Office, Office Action dated Jan. 8, 2019 for Japanese Patent Application No. 2016-574999, 4 pages.
Japanese Patent Office, Office Action dated Jan. 8, 2019 for Japanese Patent Application No. 2017-500981, 5 pages.
European Patent Office, Communication pursuant to Article 94(3) EPC dated Jan. 9, 2019 for EP Application No. 15733991.2, 8 pages.
European Patent Office, Communication pursuant to Article 94(3) EPC dated Jan. 15, 2019 for EP Application No. 15782128.1, 4 pages.
Japanese Patent Office, Office Action dated Jan. 15, 2019 for Japanese Patent Application No. 2016-575054, 4 pages.
Chinese Patent Office, Office Action dated Jan. 18, 2019 for Chinese Patent Application No. 201580032354.7, 8 pages.
European Patent Office, Communication pursuant to Article 94(3) EPC dated Jan. 23, 2019 for EP Application No. 15742490.4, 9 pages.
United States Patent and Trademark Office, Notice of Allowance dated Feb. 4, 2019 for U.S. Appl. No. 14/748,148, 14 pages.
Japanese Patent Office, Office Action dated Feb. 5, 2019 for Japanese Patent Application No. 2016-574998, 4 pages.
United States Patent and Trademark Office, Notice of Allowance dated Feb. 7, 2019 for U.S. Appl. No. 14/866,631, 26 pages.
Chinese Patent Office, Office Action dated Mar. 4, 2019 for Chinese Patent Application No. 201580033971.9, 14 pages.
Chinese Patent Office, Office Action dated Mar. 6, 2019 for Chinese Patent Application No. 201580033969.1, 7 pages.
United States Patent and Trademark Office, Notice of Allowance dated Mar. 14, 2019 for U.S. Appl. No. 14/866,042, 9 pages.
Chinese Patent Office, Office Action dated Mar. 20, 2019 for Chinese Patent Application No. 201580033903.2, 22 pages.
Chinese Patent Office, Office Action dated Mar. 29, 2019 for Chinese Patent Application No. 201580032356.6, 10 pages.
United States Patent and Trademark Office, Office Action dated Apr. 5, 2019 for U.S. Appl. No. 14/747,826, 19 pages.
United States Patent and Trademark Office, Office Action dated Apr. 9, 2019 for U.S. Appl. No. 14/748,094, 14 pages.
United States Patent and Trademark Office, Office Action dated Apr. 10, 2019 for U.S. Appl. No. 15/890,601, 20 pages.
European Patent Office, Communication pursuant to Article 94(3) EPC dated Apr. 23, 2019 for EP Application No. 15704133.6, 4 pages.
United States Patent and Trademark Office, Office Action dated Apr. 29, 2019 for U.S. Appl. No. 14/748,139, 27 pages.
United States Patent and Trademark Office, Notice of Allowance dated May 2, 2019 for U.S. Appl. No. 14/866,644, 19 pages.
European Patent Office, Communication pursuant to Article 94(3) EPC dated May 3, 2019 for EP Application No. 15742463.1, 8 pages.
United States Patent and Trademark Office, Office Action dated May 9, 2019 for U.S. Appl. No. 14/866,635, 24 pages.
Japanese Patent Office, Office Action dated May 14, 2019 for Japanese Patent Application No. 2016-574998, 3 pages.
United States Patent and Trademark Office, Notice of Allowance dated May 17, 2019 for U.S. Appl. No. 14/748,148, 14 pages.
Chinese Patent Office, Office Action dated May 23, 2019 for Chinese Patent Application No. 201580051272.7, 10 pages.
Japanese Patent Office, Office Action dated Jun. 4, 2019 for Japanese Patent Application No. 2017-516338, 5 pages.
Japanese Patent Office, Office Action dated Jun. 4, 2019 for Japanese Patent Application No. 2017-516339, 5 pages.
English Translation of Japanese Office Action dated Jun. 4, 2019 for Japanese Patent Application No. 2017-516339, prepared Jun. 10, 2019, 7 pages.
United States Patent and Trademark Office, Notice of Allowance dated Jun. 26, 2019 for U.S. Appl. No. 14/865,923, 8 pages.
Japanese Patent Office, Office Action dated Aug. 27, 2019 for Japanese Patent Application No. 2017-516114, 5 pages.
Chinese Patent Office, Office Action dated Aug. 30, 2019 for Chinese Patent Application No. 201580038690.2, 9 pages.
United States Patent and Trademark Office, Office Action dated Sep. 6, 2019 for U.S. Appl. No. 16/415,636, 9 pages.
United States Patent and Trademark Office, Office Action dated Sep. 9, 2019 for U.S. Appl. No. 14/866,631, 24 pages.
Chinese Patent Office, Office Action dated Sep. 11, 2019 for Chinese Patent Application No. 201580033903.2, 9 pages.
Japanese Patent Office, Decision for Rejection dated Sep. 17, 2019 for Japanese Patent Application No. 2016-574998, 4 pages.
United States Patent and Trademark Office, Office Action dated Sep. 20, 2019 for U.S. Appl. No. 14/865,371, 48 pages.
United States Patent and Trademark Office, Notice of Allowance dated Oct. 30, 2019 for U.S. Appl. No. 14/747,826, 9 pages.
Chinese Patent Office, Office Action dated Nov. 5, 2019 for Chinese Patent Application No. 201580035413.6, 13 pages.
European Patent Office, Communication pursuant to Article 94(3) EPC dated Nov. 6, 2019 for EP Application No. 15781215.7, 7 pages.
European Patent Office, Communication pursuant to Article 94(3) EPC dated Nov. 12, 2019 for EP Application No. 15779102.1, 6 pages.
European Patent Office, Communication pursuant to Article 94(3) EPC dated Nov. 13, 2019 for EP Application No. 15781214.0, 8 pages.
United States Patent and Trademark Office, Office Action dated Dec. 16, 2019 for U.S. Appl. No. 14/748,139, 28 pages.
United States Patent and Trademark Office, Office Action dated Jan. 15, 2020 for U.S. Appl. No. 14/866,635, 28 pages.
Chinese Patent Office, Office Action dated Jan. 16, 2020 for Chinese Patent Application No. 201580032356.6, 5 pages.
Chinese Patent Office, Office Action dated Jan. 20, 2020 for Chinese Patent Application No. 201580051609.4, 7 pages.
Chinese Patent Office, Office Action dated Jan. 20, 2020 for Chinese Patent Application No. 201580051600.3, 8 pages.
United States Patent and Trademark Office, Notice of Allowance dated Jan. 23, 2020 for U.S. Appl. No. 16/358,342, 7 pages.
United States Patent and Trademark Office, Office Action dated Mar. 4, 2020 for U.S. Appl. No. 14/865,371, 51 pages.
Japanese Patent Office, Office Action dated Mar. 10, 2020 for Japanese Patent Application No. 2017-516114, 6 pages.

(56) References Cited

OTHER PUBLICATIONS

United States Patent and Trademark Office, Office Action dated Mar. 16, 2020 for U.S. Appl. No. 14/866,631, 26 pages.
United States Patent and Trademark Office, Notice of Allowance dated Mar. 24, 2020 for U.S. Appl. No. 16/415,636, 8 pages.
Indian Patent Office, First Examination Report dated Apr. 28, 2020 for Indian Patent Application No. 201647037919, 7 pages.
Chinese Patent Office, Office Action dated Jun. 23, 2020 for Chinese Patent Application No. 201580051600.3, 3 pages.
Indian Patent Office, First Examination Report dated Jul. 2, 2020 for Indian Patent Application No. 201747032522, 7 pages.
United States Patent and Trademark Office, Office Action dated Jul. 2, 2020 for U.S. Appl. No. 14/866,631, 29 pages.
Indian Patent Office, First Examination Report dated Jul. 10, 2020 for Indian Patent Application No. 201747014022, 6 pages.
Indian Patent Office, First Examination Report dated Jul. 10, 2020 for Indian Patent Application No. 201747014025, 7 pages.
Indian Patent Office, First Examination Report dated Jul. 15, 2020 for Indian Patent Application No. 201647040210, 6 pages.
Indian Patent Office, First Examination Report dated Jul. 17, 2020 for Indian Patent Application No. 201747014173, 7 pages.
United States Patent and Trademark Office, Notice of Allowance dated Jul. 27, 2020 for U.S. Appl. No. 16/117,343, 7 pages.
United States Patent and Trademark Office, Notice of Allowance dated Jul. 27, 2020 for U.S. Appl. No. 16/525,212, 20 pages.
United States Patent and Trademark Office, Notice of Allowance dated Jul. 29, 2020 for U.S. Appl. No. 16/398,887, 21 pages.
Indian Patent Office, First Examination Report dated Aug. 4, 2020 for Indian Patent Application No. 201647037917, 6 pages.
United States Patent and Trademark Office, Notice of Allowance dated Aug. 20, 2020 for U.S. Appl. No. 16/415,636, 8 pages.
United States Patent and Trademark Office, Notice of Allowance dated Aug. 28, 2020 for U.S. Appl. No. 14/748,139, 12 pages.
Japanese Patent Office, Office Action dated Sep. 1, 2020 for Japanese Patent Application No. 2017-561342, 2 pages.
Chinese Patent Office, Office Action dated Sep. 2, 2020 for Chinese Patent Application No. 201580051282.0, 10 pages.
United States Patent and Trademark Office, Office Action dated Dec. 27, 2017 for U.S. Appl. No. 14/865,733, 11 pages.
United States Patent and Trademark Office, Office Action dated Dec. 28, 2017 for U.S. Appl. No. 14/866,631, 20 pages.
United States Patent and Trademark Office, Office Action dated Dec. 28, 2017 for U.S. Appl. No. 14/866,635, 12 pages.
United States Patent and Trademark Office, Office Action dated Dec. 28, 2017 for U.S. Appl. No. 14/748,011, 31 pages.
United States Patent and Trademark Office, Notice of Allowance dated Jan. 10, 2018 for U.S. Appl. No. 14/857,451, 13 pages.
European Patent Office, Communication pursuant to Article 94(3) EPC dated Jan. 25, 2018 for EP Application No. 15733990.4, 6 pages.
United States Patent and Trademark Office, Notice of Allowance dated Jan. 29, 2018 for U.S. Appl. No. 14/747,866, 10 pages.
United States Patent and Trademark Office, Office Action dated Feb. 8, 2018 for U.S. Appl. No. 14/865,748, 13 pages.
European Patent Office, Communication pursuant to Article 94(3) EPC dated Feb. 12, 2018 for EP Application No. 15736357.3, 9 pages.
United States Patent and Trademark Office, Notice of Allowance dated Feb. 20, 2018 for U.S. Appl. No. 14/748,102, 8 pages.
European Patent Office, Communication pursuant to Article 94(3) EPC dated Feb. 22, 2018 for EP Application No. 15742490.4, 8 pages.
United States Patent and Trademark Office, Office Action dated Feb. 27, 2018 for U.S. Appl. No. 14/799,273, 25 pages.
United States Patent and Trademark Office, Office Action dated Feb. 28, 2018 for U.S. Appl. No. 15/146,312, 20 pages.
United States Patent and Trademark Office, Office Action dated Mar. 5, 2018 for U.S. Appl. No. 14/866,042, 9 pages.
United States Patent and Trademark Office, Office Action dated Mar. 16, 2018 for U.S. Appl. No. 15/204,351, 16 pages.
United States Patent and Trademark Office, Notice of Allowance dated Mar. 22, 2018 for U.S. Appl. No. 14/747,853, 8 pages.
United States Patent and Trademark Office, Office Action dated Apr. 9, 2018 for U.S. Appl. No. 15/403,396, 14 pages.
United States Patent and Trademark Office, Notice of Allowance dated Apr. 11, 2018 for U.S. Appl. No. 14/866,642, 13 pages.
United States Patent and Trademark Office, Office Action dated Apr. 12, 2018 for U.S. Appl. No. 14/865,758, 47 pages.
United States Patent and Trademark Office, Office Action dated Apr. 12, 2018 for U.S. Appl. No. 14/865,767, 27 pages.
United States Patent and Trademark Office, Notice of Allowance dated Apr. 13, 2018 for U.S. Appl. No. 14/747,982, 10 pages.
United States Patent and Trademark Office, Office Action dated Apr. 19, 2018 for U.S. Appl. No. 14/864,708, 11 pages.
United States Patent and Trademark Office, Office Action dated Apr. 19, 2018 for U.S. Appl. No. 14/864,719, 11 pages.
United States Patent and Trademark Office, Office Action dated May 10, 2018 for U.S. Appl. No. 14/866,601, 14 pages.
United States Patent and Trademark Office, Notice of Allowance dated May 10, 2018 for U.S. Appl. No. 14/973,052, 12 pages.
United States Patent and Trademark Office, Notice of Allowance dated May 11, 2018 for U.S. Appl. No. 14/748,011, 6 pages.
United States Patent and Trademark Office, Office Action dated May 17, 2018 for U.S. Appl. No. 14/795,427, 17 pages.
United States Patent and Trademark Office, Office Action dated May 18, 2018 for U.S. Appl. No. 14/747,826, 25 pages.
United States Patent and Trademark Office, Notice of Allowance dated May 18, 2018 for U.S. Appl. No. 15/403,396, 10 pages.
United States Patent and Trademark Office, Office Action dated May 21, 2018 for U.S. Appl. No. 15/466,267, 14 pages.
United States Patent and Trademark Office, Office Action dated May 31, 2018 for U.S. Appl. No. 15/064,761, 13 pages.
United States Patent and Trademark Office, Office Action dated Jun. 1, 2018 for U.S. Appl. No. 14/748,148, 17 pages.
United States Patent and Trademark Office, Office Action dated Jun. 6, 2018 for U.S. Appl. No. 15/213,166, 14 pages.
United States Patent and Trademark Office, Notice of Allowance dated Jun. 13, 2018 for U.S. Appl. No. 14/865,733, 9 pages.
United States Patent and Trademark Office, Office Action dated Jul. 2, 2018 for U.S. Appl. No. 14/866,644, 18 pages.
Chinese Patent Office, Office Action dated Jul. 20, 2018 for Chinese Patent Application No. 201580003512.6, 8 pages.
United States Patent and Trademark Office, Office Action dated Jul. 23, 2018 for U.S. Appl. No. 14/748,139, 31 pages.
United States Patent and Trademark Office, Office Action dated Jul. 27, 2018 for U.S. Appl. No. 14/866,042, 11 pages.
United States Patent and Trademark Office, Office Action dated Aug. 6, 2018 for U.S. Appl. No. 14/866,631, 33 pages.
United States Patent and Trademark Office, Office Action dated Aug. 27, 2018 for U.S. Appl. No. 14/866,635, 27 pages.
United States Patent and Trademark Office, Notice of Allowance dated Aug. 30, 2018 for U.S. Appl. No. 15/204,351, 15 pages.
United States Patent and Trademark Office, Office Action dated Sep. 27, 2018 for U.S. Appl. No. 14/865,923, 29 pages.
United States Patent and Trademark Office, Office Action dated Oct. 16, 2018 for U.S. Appl. No. 15/146,312, 32 pages.
United States Patent and Trademark Office, Notice of Allowance dated Oct. 18, 2018 for U.S. Appl. No. 15/064,761, 12 pages.
Chinese Patent Office, Office Action dated Nov. 5, 2018 for Chinese Patent Application No. 201580032647.5, 11 pages.
United States Patent and Trademark Office, Office Action dated Nov. 5, 2018 for U.S. Appl. No. 14/747,826, 33 pages.
United States Patent and Trademark Office, Office Action dated Nov. 14, 2018 for U.S. Appl. No. 14/864,708, 16 pages.
United States Patent and Trademark Office, Office Action dated Nov. 15, 2018 for U.S. Appl. No. 14/864,719, 12 pages.
Japanese Patent Office, Office Action dated Dec. 18, 2018 for Japanese Patent Application No. 2016-575042, 5 pages.
United States Patent and Trademark Office, Office Action dated Jan. 4, 2019 for U.S. Appl. No. 14/865,371, 40 pages.
Korean Intellectual Property Office, Notice of Office Action dated Jul. 14, 2021 for Korean Patent Application No. 10-2017-7001747, 14 pages.

(56) References Cited

OTHER PUBLICATIONS

United States Patent and Trademark Office, Office Action dated Jan. 23, 2017 for U.S. Appl. No. 14/748,146, 12 pages.
United States Patent and Trademark Office, Office Action dated Feb. 2, 2017 for U.S. Appl. No. 14/747,718, 31 pages.
United States Patent and Trademark Office, Office Action dated Feb. 17, 2017 for U.S. Appl. No. 14/866,644, 12 pages.
United States Patent and Trademark Office, Office Action dated Feb. 23, 2017 for U.S. Appl. No. 14/747,982, 11 pages.
United States Patent and Trademark Office, Notice of Allowance dated Mar. 1, 2017 for U.S. Appl. No. 14/748,142, 17 pages.
United States Patent and Trademark Office, Office Action dated Mar. 10, 2017 for U.S. Appl. No. 14/747,866, 21 pages.
United States Patent and Trademark Office, Office Action dated Mar. 24, 2017 for U.S. Appl. No. 14/747,853, 22 pages.
United States Patent and Trademark Office, Office Action dated Apr. 19, 2017 for U.S. Appl. No. 14/747,675, 15 pages.
United States Patent and Trademark Office, Office Action dated Apr. 20, 2017 for U.S. Appl. No. 14/797,827, 17 pages.
United States Patent and Trademark Office, Office Action dated Apr. 27, 2017 for U.S. Appl. No. 14/748,094, 12 pages.
United States Patent and Trademark Office, Office Action dated Apr. 28, 2017 for U.S. Appl. No. 14/748,011, 25 pages.
United States Patent and Trademark Office, Office Action dated May 19, 2017 for U.S. Appl. No. 14/747,826, 23 pages.
United States Patent and Trademark Office, Office Action dated Jun. 8, 2017 for U.S. Appl. No. 14/865,733, 8 pages.
United States Patent and Trademark Office, Office Action dated Jun. 14, 2017 for U.S. Appl. No. 14/864,719, 7 pages.
United States Patent and Trademark Office, Office Action dated Jun. 15, 2017 for U.S. Appl. No. 14/864,708, 7 pages.
United States Patent and Trademark Office, Office Action dated Jun. 23, 2017 for U.S. Appl. No. 14/799,273, 14 pages.
United States Patent and Trademark Office, Office Action dated Jun. 29, 2017 for U.S. Appl. No. 14/864,748, 11 pages.
United States Patent and Trademark Office, Office Action dated Jun. 30, 2017 for U.S. Appl. No. 14/864,725, 8 pages.
United States Patent and Trademark Office, Notice of Allowance dated Jul. 10, 2017 for U.S. Appl. No. 15/059,193, 14 pages.
United States Patent and Trademark Office, Notice of Allowance dated Jul. 11, 2017 for U.S. Appl. No. 15/059,872, 13 pages.
United States Patent and Trademark Office, Office Action dated Jul. 13, 2017 for U.S. Appl. No. 14/860,348, 8 pages.
United States Patent and Trademark Office, Office Action dated Jul. 20, 2017 for U.S. Appl. No. 14/860,513, 9 pages.
United States Patent and Trademark Office, Office Action dated Jul. 27, 2017 for U.S. Appl. No. 14/748,102, 12 pages.
United States Patent and Trademark Office, Office Action dated Jul. 28, 2017 for U.S. Appl. No. 14/863,245, 27 pages.
United States Patent and Trademark Office, Office Action dated Jul. 28, 2017 for U.S. Appl. No. 14/866,601, 10 pages.
United States Patent and Trademark Office, Office Action dated Aug. 9, 2017 for U.S. Appl. No. 14/747,982, 15 pages.
United States Patent and Trademark Office, Office Action dated Aug. 10, 2017 for U.S. Appl. No. 14/795,427, 14 pages.
United States Patent and Trademark Office, Office Action dated Aug. 10, 2017 for U.S. Appl. No. 14/799,250, 8 pages.
United States Patent and Trademark Office, Office Action dated Aug. 10, 2017 for U.S. Appl. No. 14/865,758, 34 pages.
United States Patent and Trademark Office, Office Action dated Aug. 11, 2017 for U.S. Appl. No. 14/865,767, 23 pages.
United States Patent and Trademark Office, Notice of Allowance dated Aug. 16, 2017 for U.S. Appl. No. 14/866,618, 14 pages.
United States Patent and Trademark Office, Office Action dated Aug. 17, 2017 for U.S. Appl. No. 15/064,754, 15 pages.
United States Patent and Trademark Office, Office Action dated Aug. 18, 2017 for U.S. Appl. No. 14/799,273, 19 pages.
United States Patent and Trademark Office, Office Action dated Aug. 24, 2017 for U.S. Appl. No. 14/857,451, 8 pages.
United States Patent and Trademark Office, Office Action dated Aug. 25, 2017 for U.S. Appl. No. 15/403,396, 23 pages.
United States Patent and Trademark Office, Office Action dated Sep. 12, 2017 for U.S. Appl. No. 14/866,644, 10 pages.
United States Patent and Trademark Office, Office Action dated Sep. 22, 2017 for U.S. Appl. No. 14/864,723, 8 pages.
United States Patent and Trademark Office, Office Action dated Sep. 25, 2017 for U.S. Appl. No. 14/864,797, 10 pages.
United States Patent and Trademark Office, Office Action dated Oct. 6, 2017 for U.S. Appl. No. 14/748,139, 11 pages.
United States Patent and Trademark Office, Office Action dated Oct. 11, 2017 for U.S. Appl. No. 14/866,515, 12 pages.
United States Patent and Trademark Office, Office Action dated Oct. 20, 2017 for U.S. Appl. No. 14/748,148, 19 pages.
United States Patent and Trademark Office, Office Action dated Nov. 3, 2017 for U.S. Appl. No. 14/747,866, 23 pages.
United States Patent and Trademark Office, Office Action dated Nov. 3, 2017 for U.S. Appl. No. 14/747,853, 25 pages.
United States Patent and Trademark Office, Office Action dated Nov. 3, 2017 for U.S. Appl. No. 14/866,642, 11 pages.
United States Patent and Trademark Office, Office Action dated Nov. 3, 2017 for U.S. Appl. No. 14/973,052, 11 pages.
United States Patent and Trademark Office, Office Action dated Nov. 29, 2017 for U.S. Appl. No. 14/748,094, 15 pages.
United States Patent and Trademark Office, Office Action dated Nov. 30, 2017 for U.S. Appl. No. 14/868,050, 7 pages.
United States Patent and Trademark Office, Office Action dated Dec. 13, 2017 for U.S. Appl. No. 14/797,827, 19 pages.
United States Patent and Trademark Office, Office Action dated Dec. 15, 2017 for U.S. Appl. No. 14/747,675, 15 pages.
United States Patent and Trademark Office, Office Action dated Dec. 19, 2017 for U.S. Appl. No. 14/865,923, 13 pages.
China National Intellectual Property Administration, Notification to Grant Patent Right dated May 26, 2021 for Chinese Patent Application No. 201580051282.0, 2 pages.
Korean Intellectual Property Office, Notice of Office Action dated May 24, 2021 for Korean Patent Application No. 10-2017-7002052, 8 pages.
The Korean Intellectual Property Office, Notice of Office Action dated Oct. 19, 2021 for Korean Patent Application No. 10-2017-7002201, 15 pages.
The Korean Intellectual Property Office, Notice of Office Action dated Jul. 14, 2021 for Korean Patent Application No. 10-2017-7001746, 8 pages.
The Korean Intellectual Property Office, Notice of Office Action dated Aug. 2, 2021 for Korean Patent Application No. 10-2017-7001907, 8 pages.
The Korean Intellectual Property Office, Notice of Office Action dated Aug. 12, 2021 for Korean Patent Application No. 10-2017-7001179, 10 pages.
European Patent Office, Communication pursuant to Article 94(3) EPC dated Oct. 4, 2021 for European Patent Application No. 15781215.7, 5 pages.
United States Patent and Trademark Office, Office Communication dated Nov. 12, 2021 for U.S. Appl. No. 14/748,094, 20 pages.
The Korean Intellectual Property Office, Notice of Office Action dated Dec. 21, 2021 for Korean Patent Application No. 10-2017-7003705, 18 pages.
The Korean Intellectual Property Office, Notice of Office Action dated Nov. 29, 2021 for Korean Patent Application No. 10-2017-7003960, 14 pages.
The Korean Intellectual Property Office, Notice of Office Action dated Jan. 5, 2022 for Korean Patent Application No. 10-2017-7009554, 12 pages.

SYSTEM AND METHOD FOR SUPPORTING MULTI-TENANCY IN AN APPLICATION SERVER, CLOUD, OR OTHER ENVIRONMENT

CLAIM OF PRIORITY

This application is a continuation of U.S. Patent Application titled "SYSTEM AND METHOD FOR SUPPORTING MULTI-TENANCY IN AN APPLICATION SERVER, CLOUD, OR OTHER ENVIRONMENT", application Ser. No. 15/948,721, filed on Apr. 9, 2018, and issued as U.S. Pat. No. 10,742,568; which is a continuation of U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed on Jan. 21, 2015, and issued as U.S. Pat. No. 9,961,011; which claims the benefit of priority to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed on Jan. 21, 2014; and U.S. Provisional Application titled "SYSTEM AND METHOD FOR SUPPORTING MULTI-TENANCY IN AN APPLICATION SERVER, CLOUD, OR OTHER ENVIRONMENT", Application No. 62/015,966, filed on Jun. 23, 2014; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting multi-tenancy in such environments.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting multi-tenancy in an application server, cloud, on-premise, or other environment, which enables categories of components and configurations to be associated with particular application instances or partitions. Resource group templates define, at a domain level, collections of deployable resources that can be referenced from resource groups. Each resource group is a named, fully-qualified collection of deployable resources that can reference a resource group template. A partition provides an administrative and runtime subdivision of the domain, and contains one or more resource groups. Each resource group can reference a resource group template, to bind deployable resources to partition-specific values, for use by the referencing partition. A tenant of the application server or cloud environment can be associated with a partition, or applications deployed therein, for use by that tenant.

DETAILED DESCRIPTION

Figure 1:
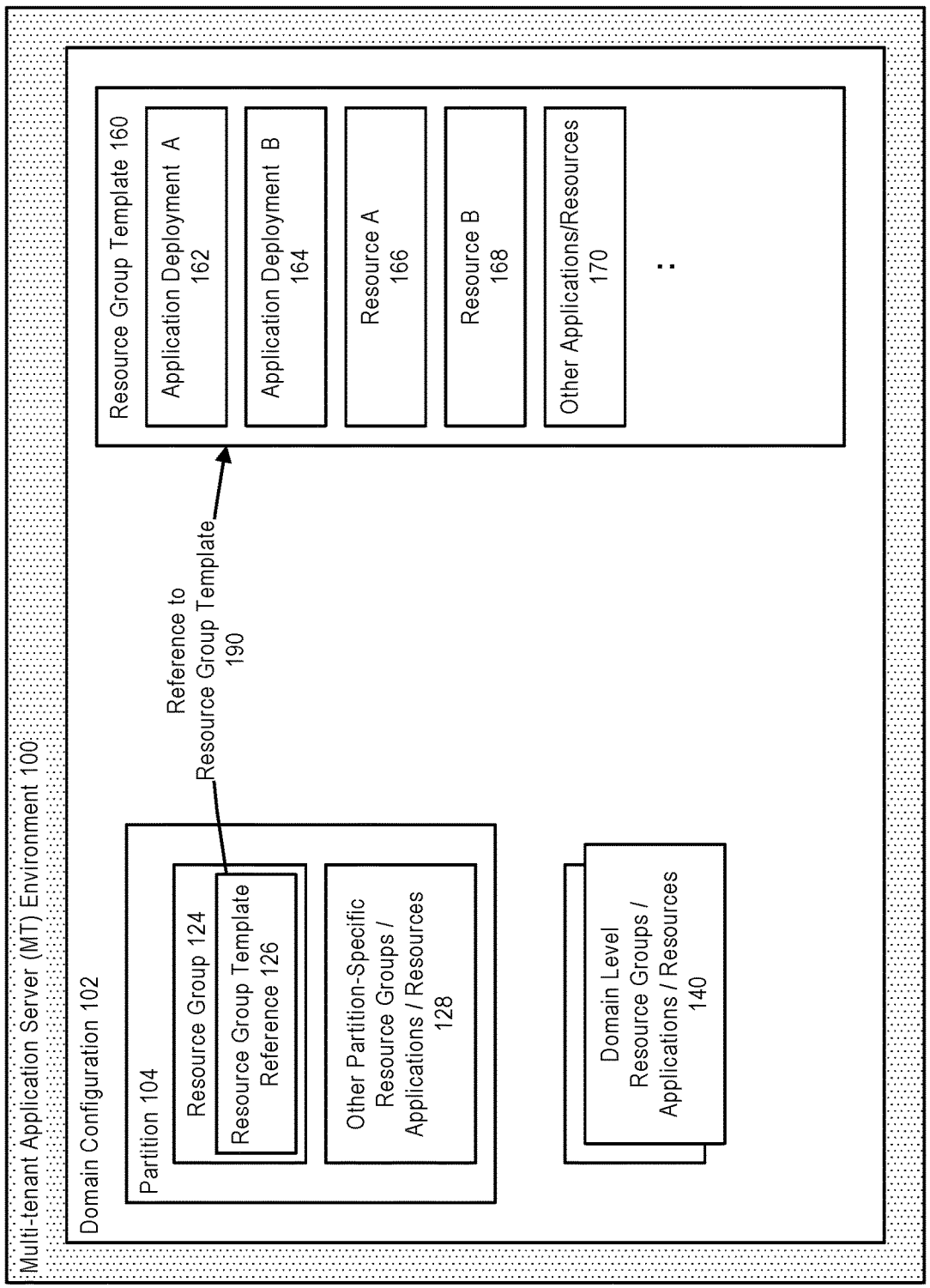
FIG. 1 illustrates a system for supporting multi-tenancy in an application server, cloud, or other environment, in accordance with an embodiment.

As described above, application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

To address the needs of such environments, in accordance with an embodiment, described herein is a system and method for supporting multi-tenancy in an application server, cloud, on-premise, or other environment, which enables categories of components and configurations to be associated with particular application instances or partitions. Resource group templates define, at a domain level, collections of deployable resources that can be referenced from resource groups. Each resource group is a named, fully-qualified collection of deployable resources that can reference a resource group template. A partition provides an administrative and runtime subdivision of the domain, and contains one or more resource groups. Each resource group can reference a resource group template, to bind deployable resources to partition-specific values, for use by the referencing partition. A tenant of the application server or cloud environment can be associated with a partition, or applications deployed therein, for use by that tenant.

For example, Java EE application servers, such as Oracle WebLogic Server (WLS) and Glassfish, can run Java archives with a degree of isolation. In accordance with an embodiment, a software application can be viewed as comprising a first category of components or configurations being a set of Java archives or other components that are managed at a system or domain level; and a second category being a configuration required to run those archives and managed at an application level. An instance of system or domain components can be run with several sets of instances or partitions of application components, with particular partitions mapping to particular tenants.

In accordance with an embodiment, the system can support multi-tenant use cases that provide software-as-a-service (SaaS), or platform-as-a-service (PaaS) capabilities, and require a means of distinguishing between different tenants.

For example, in a SaaS use case, the system can enable sharing of an application server infrastructure among multiple tenants, using a tenant-aware application that recognizes different tenants. Based on a user's identity, a tenant-aware application can determine the particular tenant to which the user belongs, and use that information to access a resource, such as a tenant-specific database connection or a JMS queue, that is pertinent to that particular tenant.

As another example, in a PaaS use case, the system can enable multiple tenants to run different applications, with little or no overlap between the various tenant environments, and for each particular tenant to be able to administer certain aspects of their own runtime environment, such as deploying applications for those users associated with that particular tenant.

As another example, in the case of enterprise software application environments, such as Oracle Fusion Applications, which may include applications that are not themselves tenant-aware, but it is desired to simplify the application lifecycle, the system can support usage of a single copy of an application installation which can be realized at runtime as multiple different copies. Each copy can run within its own partition and use a different classloader, allowing each copy to connect to different databases, or to different portable databases (PDB) running within a same container database (CDB).

In accordance with other embodiments, the system can also address traditional use cases, so that users can use a multi-tenant version of an application server in a similar manner as they had previously, and are not required to use any of its multi-tenancy features.

Various other use cases and examples are described in further detail below, including, for purposes of illustration, embodiments of a multi-tenant WLS application server environment (referred to herein as WLS-MT). In accordance with other embodiments, similar functionality and features can also be provided for use with other application server, cloud, on-premise, or other environments.

Multi-Tenant Environment

FIG. 1 illustrates a system for supporting multi-tenancy in an application server, cloud, or other environment, in accordance with an embodiment.

As illustrated in FIG. 1, in accordance with an embodiment, a multi-tenant application server environment 100, for example an application server or other component that enables software applications to be deployed and run within the environment, can be configured to include and to operate according to an application server domain configuration 102, which is used at runtime to define an application server domain.

In accordance with an embodiment, the application server can further include one or more partitions 104 that are defined for use at runtime. Each partition can be associated with a partition identifier (ID) and configuration, and can further include one or more resource groups 124, together with a reference to a resource group template 126, and/or other partition-specific applications or resources 128.

In accordance with an embodiment, additional resource groups, applications and/or resources 140 can also be defined at the domain level, optionally together with a reference to a resource group template.

In accordance with an embodiment, the application server can further include one or more resource group templates 160 that are defined for use at runtime. Each resource group template can include one or more application deployments 162, 164, resources 166, 168, and/or other deployable applications or resources 170.

In accordance with an embodiment, each resource group can reference a resource group template. For example, the illustrated resource group 124 in partition 104, can reference 190 the resource group template 160.

Generally, a system administrator can create or delete partitions, domain-level resource groups are referenceable from partitions, realms, and domain-level resource group templates. A partition administrator can typically administer various aspects of their own partition, for example, create resource groups, deploy applications to the partition, and reference specific realms for the partition.

In accordance with some embodiments, a tenant administrator role can also be defined to support tenant-level administrative tasks, although such tasks can alternatively be driven by the components themselves, and thereafter map to corresponding system-level or partition-level actions.

Figure 2:
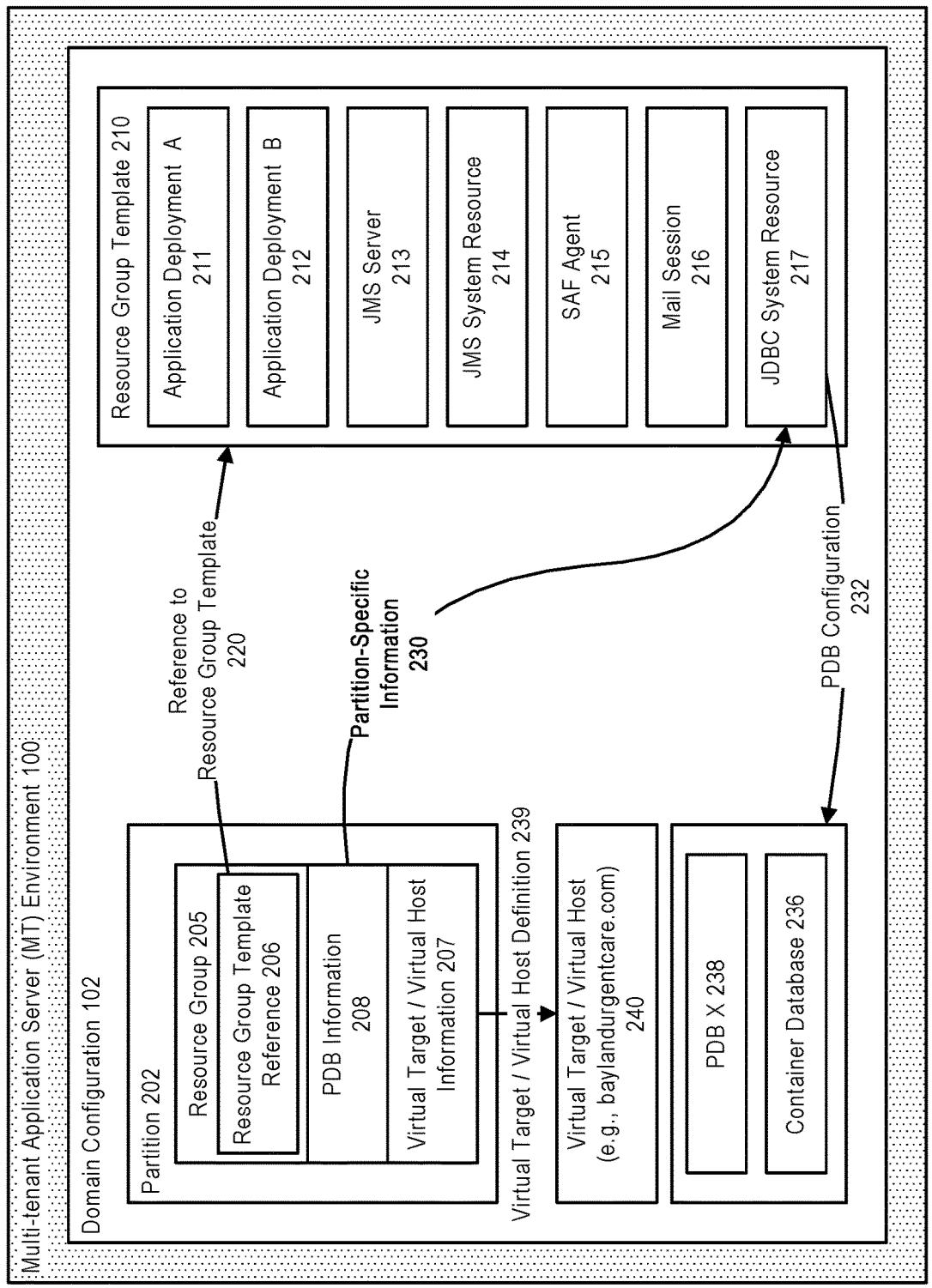
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 with reference to a resource group template 206, a virtual target/virtual host information 207, and a PDB information 208. A resource group template 210 can include, for example, a plurality of application deployments A 211 and B 212, together with deployable resources, such as a JMS server 213, a JMS system resource 214, an SAF agent 215, a mail session component 216, and a JDBC system resource 217. The partition and resource group template illustrated in FIG. 2 is provided merely by way of example, and in accordance with other embodiments different partition and/or resource group template elements can be provided.

In accordance with an embodiment, a partition (for example, partition 202), can reference or extend 220 a particular resource group template (for example, resource group template 210). Such referencing enables, for example, a PDB information associated with a particular partition to be used in combination with the referenced resource group template, to indicate a partition-specific information 230 for the partition, such as a partition-specific PDB information. The partition-specific PDB information can then be used by the application server to configure resources for use by the partition.

For example, as illustrated in FIG. 2, the partition-specific PDB information associated with partition 202 can be used, by the application server, to configure 232 a container database 236 with an appropriate PDB 238, for use by that partition.

Similarly, in accordance with an embodiment, a virtual target/virtual host information associated with a particular partition can be used to define 239 a partition-specific virtual target/virtual host 240, for use by the partition, which in the illustrated example can then be made accessible at baylandurgentcare.com.

Figure 3:
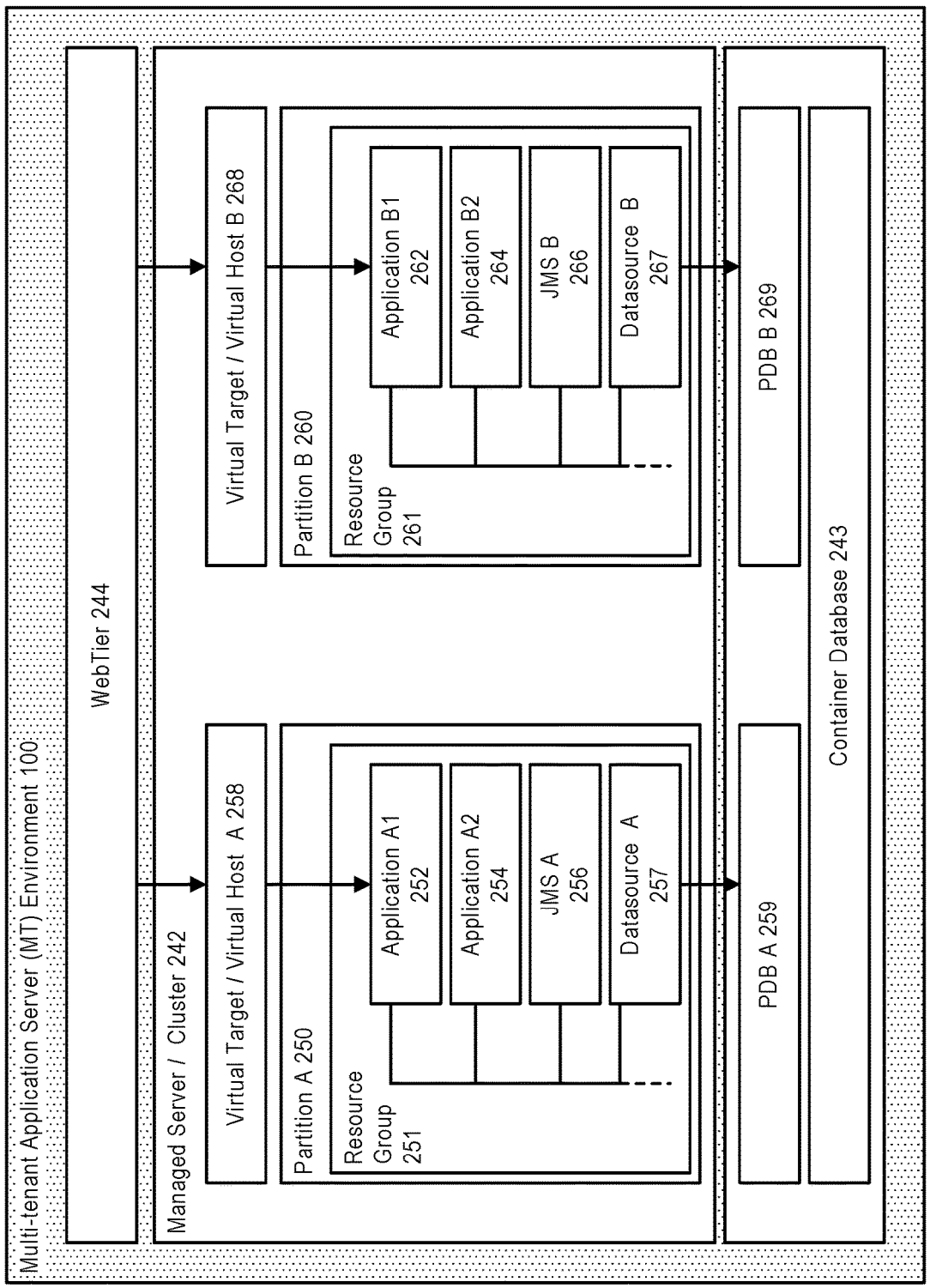
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a configuration which is defined, for example, by a configuration file such as a config.xml file, can be used to define a partition, including elements for resource groups associated with that partition, database, and/or other partition properties. Values can be specified per partition using, e.g., property name/value pairs in resource groups. Resource groups can be globally defined at the domain level, or can be specific to a partition.

As illustrated in FIG. 3, in accordance with an embodiment, a plurality of partitions can be executed within a managed server/cluster 242, or a similar environment which can provide access to a container database 243, and which is accessible via a web tier 244. In accordance with an embodiment, a domain can generally correspond to the container database, with each partition or tenant implicitly associated with one or more of the PDBs of the container database.

In accordance with an embodiment, each of the plurality of partitions, in this example a partition A 250 and a partition B 260, can be configured to include a plurality of resources associated with that partition. In the example illustrated, partition A can be configured to include a resource group 251 which contains an application A1 252, application A2 254, and JMS A 256, together with a datasource A 257 that is associated with a PDB A 259 in the container database, wherein the partition is accessible via a virtual target/virtual host A 258. Similarly, in this example, partition B 260 can be configured to include a resource group 261 which contains an application B1 262, application B2 264, and JMS B 266, together with a datasource B 267 that is associated with a PDB B 269 in the container database, wherein the partition is accessible via a virtual target/virtual host B 268.

While several of the above examples illustrate use of a CDB and PDBs, in accordance with other embodiments, other types of multi-tenant and non-multi-tenant databases can be supported wherein a specific configuration can be provided for each partition, for example through the use of schemas, or different databases.

Tenants

In accordance with an embodiment, a tenant is an entity that can be represented by, or otherwise associated with, one or more partitions, and/or one or more tenant-aware applications.

For example, in accordance with an embodiment, tenants can represent distinct user organizations, such as different external companies, or different departments within a particular enterprise (e.g., HR and Finance departments), each of which can be associated with a different partition. A tenant identity (ID) is the association of a particular user, at a particular moment in time, with a particular tenant. The system can derive which tenant the particular user belongs to from the user identity, for example by referring to a user identity store. The user identity also enables the system to enforce those actions that a user is authorized to do as they move throughout the system, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that applications working on behalf of a particular tenant refer only to resources pertinent to that tenant, and not to resources associated with other tenants.

In accordance with an embodiment, a tenant-unaware application is one that contains no logic dealing with tenants explicitly. Any resources that the application uses are in play regardless of what user submitted a request to which the application is responding. In contrast a tenant-aware application does contain logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, in accordance with an exemplary embodiment described in further detail below, a sample tenant-aware application "MedRec", which supports a single doctor's office or hospital, can be exposed to two different tenants, e.g., Bayland Urgent Care, and Valley Health, each of which is able to access separate tenant-specific resources, such as separate PDBs, without changing the underlying application code.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative slice of a domain, that can be associated with a partition ID and configuration, and can contain applications and/or refer to domain-wide resources through the use of resource groups and resource group templates.

Generally, the system can be configured to provide tenant access to the administrative and runtime aspects of partitions associated with that tenant. A partition can contain its own applications, refer to domain wide applications via resource group templates, and have its own configuration. Partitionable entities can include resources as described above, for example JMS, JDBC, JavaMail, WLDF resources, in addition to other components, such as JNDI namespace, network traffic, work managers, and security policies and realms.

In accordance with an embodiment, each resource group within a partition can refer to zero or more resource group templates, while a particular resource group template can be referenced from multiple partitions. Each partition can also define properties for configuration data that is not specified in the resource group templates to which the partition's resource groups refer. This enables the partition to act as a binding of deployable resources defined in resource group templates, to specific values for use within that partition. In some cases, a partition can also override certain configuration information specified by a resource group template.

In accordance with an embodiment, a partition configuration, as defined for example by a configuration file (e.g., config.xml), can include a plurality of configuration elements, such as: "partition", which contains the attributes and child elements that define the partition; "resource-group", which contains the applications and resources deployed to the partition; "resource-group-template", which contains applications and resources; "jdbc-system-resource-override", which contains a DB-specific service name, user name, and password; and "partition-properties", which contains property key values that can be used for macro replacement in resource group templates.

Exemplary fragments of configuration files for use with the MedRec application are illustrated below, showing how the configuration file may appear for a partition, in which the resource group template contains several application deployments, a JMS server, a mail session, a JMS system resource, a JDBC system resource, and an SAF agent. Upon startup, the system can use the information provided by the configuration file to generate partition-specific configuration elements for each resource, from the resource group template:

```xml
<partition>
    <name>Partition-0</name>
    <resource-group>
        <name>PartitionResourceGroup-0</name>
        <app-deployment>
            <name>shoppingcart</name>
            <module-type>war</module-type>
<source-path>/Users/chanpate/Downloads/shoppingcart.war</source-path>
            <security-dd-model>DDOnly</security-dd-model>
            <staging-mode xsi:nil="true"></staging-mode>
            <plan-staging-mode xsi:nil="true"></plan-staging-mode>
<cache-in-app-directory>false</cache-in-app-directory>
        </app-deployment>
        <target>VirtualTarget-0</target>
    </resource-group>
    <jdbc-system-resource-override>
        <name>JDBCSystemResourceOverride-0</name>
        <data-source-name>JDBC1</data-source-name>
        <url>jdbc:oracle:thin:@system.slc07gwu:8989</url>
        <user>sys</user>
<password-
encrypted>{AES}oCk9VWCKfua2xZ/fWffclORE9Yj6JHnHfOM/TAI3gco=</password-
encrypted>
    </jdbc-system-resource-override>
    <available-target>VirtualTarget-0</available-target>
<partition-id>71838f74-c7e8-46f0-9a94-c20dfe346d37</partition-id>
    <system-file-system>
<root>/Users/chanpate/wls-setup/partitions/Partition-0/system</root>
        <create-on-demand>true</create-on-demand>
        <preserved>true</preserved>
    </system-file-system>
</partition>
<partition>
    <name>partition1</name>
    <resource-group>
        <name>partition1-rg</name>
        <resource-group-template>MedrecRGT</resource-group-template>
        <target>partition1</target>
    </resource-group>
    <jdbc-system-resource-override>
        <name>MedRecGlobalDataSourceXA</name>
        <data-source-name>MedRecGlobalDataSourceXA</data-source-name>
        <url>jdbc:derby://localhost:1528/mtdb2;create=true</url>
        <user>scott</user>
        <password-
encrypted>{AES}TxJOS7kX8M6G2ICNa6EYX2Lno/GoeF1UaLT4gL88x6U=</password-
encrypted>
    </jdbc-system-resource-override>
    <default-target>partition1</default-target>
    <available-target>partition1</available-target>
    <realm>partition1-realm</realm>
    <partition-id>a2eee77e-4340-403a-947e-fa3932f4a04f</partition-id>
</partition>
<partition>
    <name>partition2</name>
    <resource-group>
        <name>partition2-rg</name>
        <resource-group-template>MedrecRGT</resource-group-template>
        <target>partition2</target>
    </resource-group>
    <jdbc-system-resource-override>
        <name>MedRecGlobalDataSourceXA</name>
        <data-source-name>MedRecGlobalDataSourceXA</data-source-name>
        <url>jdbc:derby://localhost:1529/mtdb3;create=true</url>
        <user>scott</user>
        <password-
```

-continued

```xml
encrypted>{AES}6AY+so/KxRKZckcjuS6vwnlG+WAAfuqsGGfMuIE3JjY=</password-
encrypted>
        </jdbc-system-resource-override>
        <default-target>partition2</default-target>
        <available-target>partition2</available-target>
        <realm>partition2-realm</realm>
        <partition-id>96f1b8c6-0337-4f44-a321-6d6911671fc2</partition-id>
</partition>
<resource-group-template>
    <name>MedrecRGT</name>
    <app-deployent>
        <name>medrec</name>
        <module-type>ear</module-type>
        <source-path>
            /scratch/stjpg/weblogic/src1214_build/Oracle_Home
            /dev.install-12.2.1.0.0-20150120233607.460/wlserver
            /samples/server/medrec/dist/standalone/medrec.ear
        </source-path>
        <plan-path>
            /scratch/stjpg/weblogic/dev/src1214/wlstest/integration
            /mt/common/apps/medrec/plans/plan.xml
        </plan-path>
        <security-dd-model>DDOnly</security-dd-model>
        <staging-mode xsi:nil="true"/>
        <plan-staging-mode xsi:nil="true"/>
        <cache-in-app-directory>false</cache-in-app-directory>
    </app-deployment>
    <app-deployment>
        <name>physician</name>
        <module-type>ear</module-type>
        <source-path>
            /scratch/stjpg/weblogic/src1214_build/Oracle_Home
            /dev.install-12.2.1.0.0-20150120233607.460/wlserver
            /samples/server/medrec/dist/
            standalone/physician.ear
        </source-path>
        <security-dd-model>DDOnly</security-dd-model>
        <staging-mode xsi:nil="true"/>
        <plan-staging-mode xsi:nil="true"/>
        <cache-in-app-directory>false</cache-in-app-directory>
    </app-deployment>
    <app-deployment>
        <name>chat</name>
        <module-type>war</module-type>
        <source-path>
            /scratch/stjpg/weblogic/src1214_build/Oracle_Home
            /dev.install-12.2.1.0.0-20150120233607.460/wlserver
            /samples/server/medrec/dist/standalone/chat.war
        </source-path>
        <security-dd-model>DDOnly</security-dd-model>
        <staging-mode xsi:nil="true"/>
        <plan-staging-mode xsi:nil="true"/>
        <cache-in-app-directory>false</cache-in-app-directory>
    </app-deployment>
    <jms-server>
        <name>MedRecJMSServer</name>
    </jms-server>
    <mail-session>
        <name>myMailSession</name>
        <jndi-name>mail/MedRecMailSession</jndi-name>
        <properties>
            mail.smtp.host=sca00bfc.us.oracle.com;mail.smtp.port=9872
        </properties>
    </mail-session>
    <jms-system-resource>
        <name>MedRec-jms</name>
        <sub-deployment>
            <name>MedRecJMSSubD</name>
            <target>MedRecJMSServer</target>
        </sub-deployment>
        <descriptor-file-name>
            resource-group-templates/MedrecRGT/jms/medrec-jms.xml
        </descriptor-file-name>
    </jms-system-resource>
    <jdbc-system-resource>
        <name>MedRecGlobalDataSourceXA</name>
        <descriptor-file-name>
            resource-group-templates/MedrecRGT/jdbc/
            MedRecGlobalDataSourceXA-9669-jdbc.xml
```

```
            </descriptor-file-name>
        </jdbc-system-resource>
</resource-group-template>
```

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a Java application.

In accordance with an embodiment, a system administrator can declare zero or more resource groups at the domain level, and one or more at the partition level.

At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group.

For example, stopping the resource group stops all of the resources in the group that are not already stopped; starting the resource group starts any resources in the group that are not already started; and removing the resource group removes all of the resources contained in the group.

At the partition level, a partition administrator can configure one or more resource groups in their partition, subject to any security restrictions. For example, in a SaaS use case, domain-level resource group templates can be defined, and various partition level resource groups can refer to those templates. In a PaaS use case, partition-level resource groups can be created that do not refer to templates, but instead represent applications and their related resources that are to be made available within that partition only.

In accordance with an embodiment, resource grouping can be used to group together Java applications and the resources they use as a distinct administrative unit within the domain. For example, in the MedRec application, a resource grouping may define the MedRec application and its resources. Multiple partitions can run the same MedRec resource group, although they use some tenant-specific configuration information, such that the Java applications that are part of each MedRec application resource instance are made specific to each tenant.

Resource Group Templates

In accordance with an embodiment, a resource group template is a collection of deployable resources defined at a domain level, that can be referenced from a resource group, and that supports the specification of partition level configuration. Not all configuration need be specified at the domain level—partition level configuration can instead be specified in the resource group template through the use of macros, for example as property name/value pairs.

In accordance with an embodiment, a resource group template is a collection of deployable resources in which at least some of the information required to activate its resources may not be stored as part of the template itself. Some of the information about such resources may be the same across all tenants, while other information may vary from one tenant to the next.

For example, in accordance with an embodiment of a SaaS use case, the system can activate the same applications and resources multiple times, once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

In accordance with an embodiment, a particular resource group template can be referenced by zero or more resource groups. The object containing the resource group, e.g., the domain or partition, can use property name/value assignments to set the value of any tokens in the resource group template. When the system activates a resource group template using a referencing resource group, it can replace those tokens with values set in the resource group's containing object.

In some cases, the system can also use statically-configured resource group templates and partitions to generate runtime configuration for each partition/template combination.

In accordance with an embodiment, a domain can contain any number of resource group templates, each of which can include, for example, one or more related Java applications and the resources on which those applications depend.

Networking Layer

In accordance with an embodiment, the system can include a networking layer that associates incoming requests with a partition ID. For example, based on a request URL (e.g., a virtual target/virtual host plus optional path), the networking layer can determine a target partition for the request, and add the determined partition ID to the request's execution context. In accordance with an embodiment, if each partition is configured to use a unique virtual target/virtual host and network access point (NAP) combination, then the system can map all requests on a particular virtual target/virtual host to the corresponding partition. If partitions are instead configured to share virtual targets/virtual hosts, then a path can be defined for the virtual target/virtual host, so that the system can determine the appropriate partition based on the virtual target/virtual host plus the configured path.

Work Manager

In accordance with an embodiment, the system can include partition-aware work managers. Each work manager can be configured with a relative priority of workload, together with a minimum threads constraint to ensure that a thread is always available for processing work requests to avoid deadlock, and a maximum threads constraint to limit the number of concurrent threads executing requests. A partition-specific work manager can be created for each partition, to ensure that applications within each partition do not exceed their configured fair share of thread resource usage for that partition.

Security Realms

In accordance with an embodiment, each partition can reference a security realm. Realms can also be referenced by multiple partitions. As described above, when a request enters the system, the system can determine the appropriate partition from the virtual target/virtual host, and store the partition ID in the request's execution context. Subsequently, when an authentication or authorization action is required, the system can utilize the partition ID to determine the appropriate realm to use.

JNDI

In accordance with an embodiment, a partition-aware JNDI framework enables applications to bind named objects and retrieve them on a per-partition basis. During startup and deployment time, application server containers can associate each partition-specific application with a corresponding partition ID. The JNDI framework can then utilize that partition ID during a bind or lookup of a named object. Partition-specific objects can be isolated from other partitions, which allows different instances of the same application to register partition-specific objects with the same JNDI name.

End-to-End Lifecycle Management

In accordance with an embodiment, providers can be used to wire infrastructure components needed to run a particular application, for example Oracle Traffic Director (OTD), database, Coherence, or JMS components.

For example, in some embodiments, the partition-specific instances of a particular application can share a same database instance. A resource group template can refer to a domain-level JDBC system resource for the single database instance, and all partitions which reference that resource group template can then use the same database instance.

In accordance with an embodiment, the several partition-specific instances of an application can connect to different database instances with common, or compatible schemas. The resource group template can declare a JDBC system resource, leaving some of the configuration to be specified in the respective partition sections of the configuration file (e.g., config.xml). Examples of such partition-level configuration for data sources can include a URL to which to connect, and/or the user credentials for authenticating and authorizing access to the referenced database instance.

In accordance with an embodiment, the data source implementation can create a separate physical connection pool for each partition to an assigned PDB within a container database, which allows the PDBs to appear to the application server as separate databases, and each partition's specific credentials to be used to establish one or more connections for the partition within that partition's pool.

Alternatively, the system can support connection-switching across PDBs, in which a separate PDB can be provided for each partition, but the data source implementation shares a single connection pool to the container database which owns the PDBs. When an application submits data requests, it does so in the context of a partition. The system can then use the partition ID to switch a shared connection to the correct partition context, before executing the request on that connection.

Application Deployment and Configuration

In accordance with an embodiment, applications can be deployed to a resource group template at the domain level, or to a resource group that is scoped to a partition or scoped to the domain. Application configuration can be overridden using deployment plans specified per application, per partition. Deployment plans can also be specified as part of a resource group. Some example application deployment commands are illustrated below.

Deploying to a resource group template in a domain:

```
java weblogic.Deployer ...
    -deploy
    -resource-group-template healthcareresources-template
    -name pharmacy pharmacy-app.ear
```

Deploying to a resource group in a partition:

```
java weblogic.Deployer ...
    -deploy
    -partition t1
    -resource-group healthcare-resources
    -name pharmacy pharmacy-app.ear
```

Deploying to a resource group in a partition with a deployment plan:

```
java weblogic.Deployer ...
    -deploy
    -partition t1
    -resource-group healthcare-resources
    -plan pharmacy-plan.xml
    -name pharmacy pharmacyapp.ear
```

Figure 4:
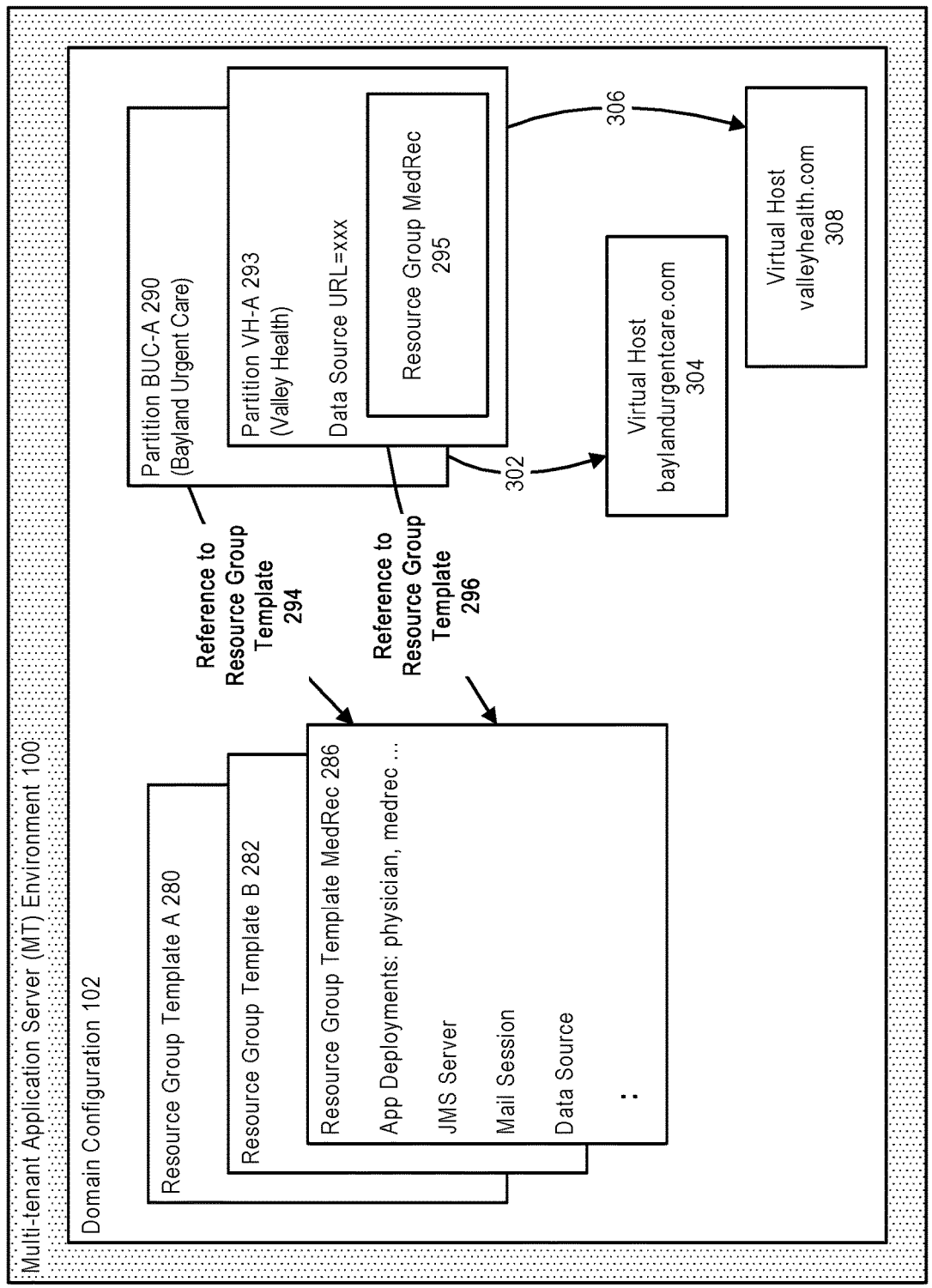
FIG. 4 illustrates an exemplary use of resource group templates, in accordance with an embodiment.

FIG. 4 illustrates an exemplary use of resource group templates, in accordance with an embodiment.

In accordance with an embodiment, when the system starts partitions, it creates virtual targets/virtual hosts and connection pools, including one for each of the partitions, to respective database instances, according to the provided configuration.

Typically, each resource group template can include one or more related Java applications and the resources on which those applications depend. As described above, each partition can provide any configuration data that is not specified in the resource group templates to which it refers, by providing a binding of the deployable resources in resource group templates, to specific values associated with the partition; and, in some cases, can override certain configuration information specified by the resource group template. This enables the system to activate an application represented by a resource group template differently for each partition, using the property values each partition has defined.

In some instances, a partition may contain self-contained resource groups that do not refer to resource group templates, or that directly define their own partition-scoped deployable resources. Applications and data sources that are defined within a partition are generally available only to that partition. In accordance with an embodiment, the system does not require or enforce either practice—users can use either type of resource group within their partitions, regardless of the intended use case.

As illustrated in FIG. 4, for example, the MedRec application can include four Java applications, a data source, a JMS server, and a mail session. To run the MedRec application for multiple tenants, the system administrator can define a single resource group template for MedRec 286, declaring those deployable resources in the template.

As described above, in contrast to domain-level deployable resources, the deployable resources declared in a resource group template may not be fully configured in the template.

For example, the MedRec resource group template may declare a data source used by the Java applications, but it may not specify the URL for connecting to the database. Typically some of the resources declared in a resource group template cannot be activated as-is, since they lack some configuration information. Partitions associated with different tenants, for example, partition BUC-A 290 (Bayland Urgent Care) and partition VH-A 293 (Valley Health) can reference 292, 294 various resource group templates, including a MedRec resource group 295 that references 296 the MedRec resource group template.

In accordance with an embodiment, the reference can then be used to create 302, 306, the virtual targets/virtual hosts for each tenant, including a virtual host baylandurgentcare-.com 304 associated with the BUC-A partition, for use by the Bayland Urgent Care tenant; and a virtual host valleyhealth-.com 306 associated with the VH-A partition, for use by the Valley Health tenant.

Figure 5:
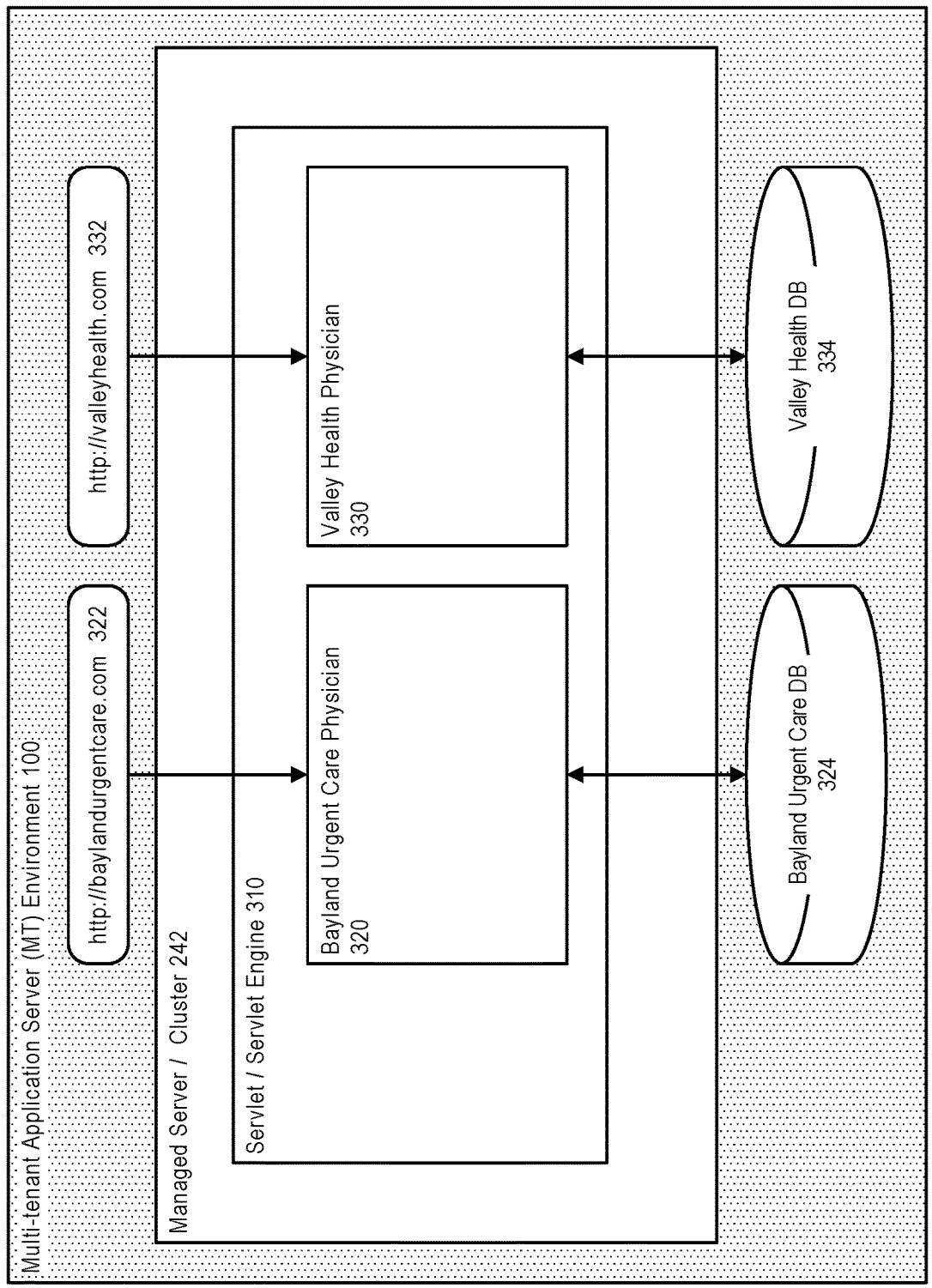
FIG. 5 illustrates an exemplary multi-tenant environment, in accordance with an embodiment.

FIG. 5 illustrates an exemplary multi-tenant environment, in accordance with an embodiment.

As illustrated in FIG. 5, and continuing the example from above, in which two partitions reference the MedRec resource group template, in accordance with an embodiment, a servlet or servlet engine can be used 310, to support a plurality of tenant environments, in this example a Bayland Urgent Care Physician environment 320, and a Valley Health Physician environment 330.

In accordance with an embodiment, each partition can define a different virtual target/virtual host on which to accept incoming traffic, and a different URL 322, 332 for connecting to its data source, in this example either a bayland urgent care database 324, or a valley health database 334 respectively. The two database instances can have compatible schemas, since the same application code will execute against both databases. When the system starts the partitions, it can create the virtual targets/virtual hosts and connection pools, one for each of the partitions, to its respective database instance.

In accordance with an embodiment, selecting which users can administer a partition is closely related to which general use case is desired. For example, in a SaaS use case, the application server system administrator may manage all of the partitions and their resource instances; whereas in a PaaS use case, each partition administrator may administer their respective partitions and the resources within them.

Figure 6:
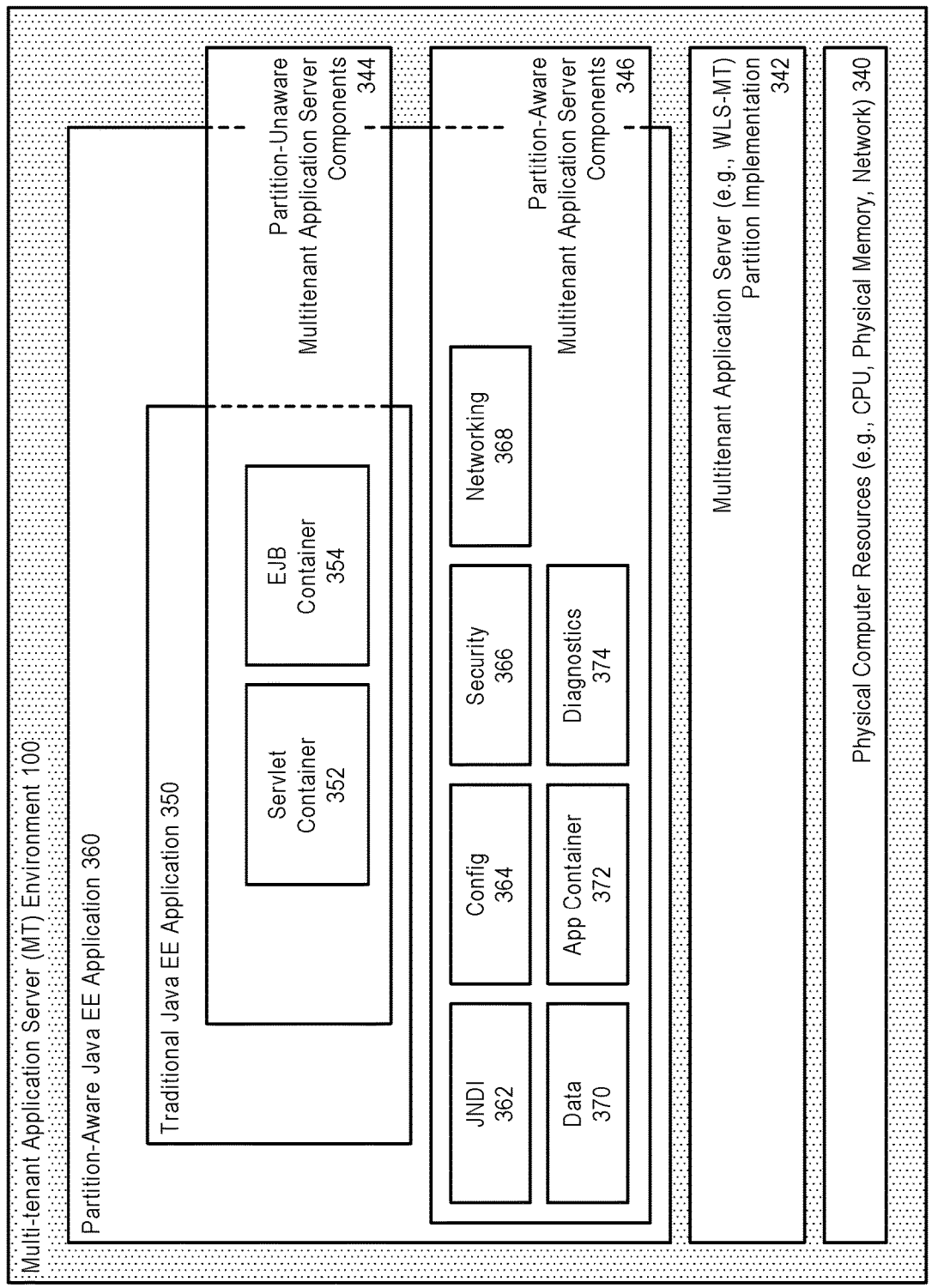
FIG. 6 illustrates a system that supports partition-unaware and partition-aware components, in accordance with an embodiment.

FIG. 6 illustrates a system that supports partition-unaware and partition-aware components, in accordance with an embodiment.

As illustrated in FIG. 6, in accordance with an embodiment, the environment can include physical computer resources, for example, CPU, physical memory, and network components 340, a multi-tenant application server (e.g. WLS-MT) partition implementation 342, and one or more partition-unaware application server components 344, and/or partition-aware application server components. A traditional, e.g., Java, application 350 may include only partition-unaware components, in this example a servlet container component 352, and an EJB container component 354. A partition-aware Java application 360 can include both partition-unaware components, and also partition-aware component, including in this example JNDI 362, config 364, security 366, networking 368, data 370, application container 372 or diagnostic 374 components.

Partition Identifiers

In accordance with an embodiment, the system includes support for partition identifiers (IDs), which can be used to allow any part of the system that is partition-aware to detect on which partition's behalf it is working (i.e., a "current" partition). In accordance with an embodiment, the partition identifier becomes part of the execution context, so that any component that needs the partition ID can obtain it using an appropriate API. In accordance with an embodiment, any component that does work on behalf of a partition, and dispatches work to another thread, must propagate the partition ID to the new thread.

Figure 7:
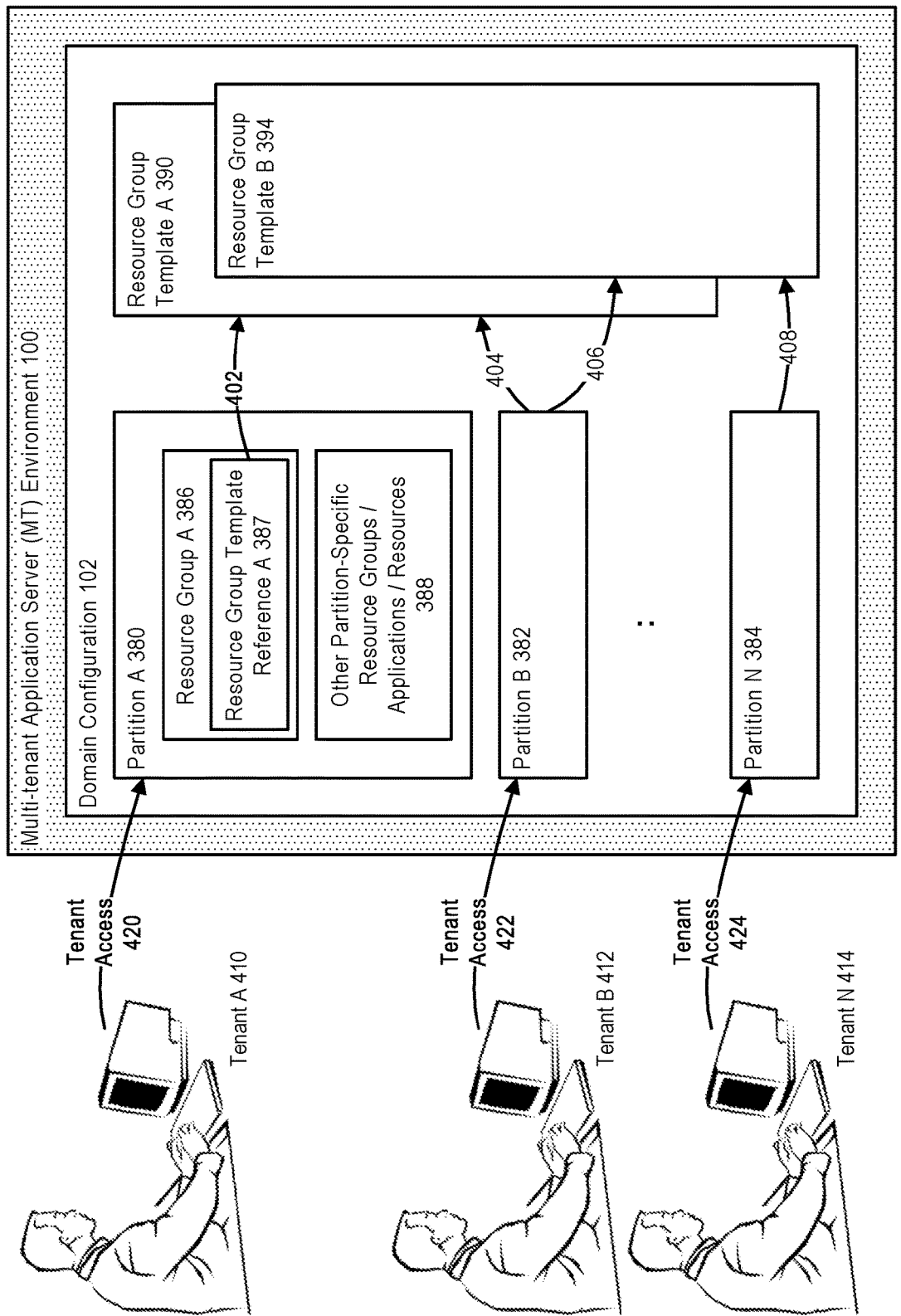
FIG. 7 illustrates access by multiple tenants to partitions in an application server, cloud, or other environment, in accordance with an embodiment.

FIG. 7 illustrates access by multiple tenants to partitions in an application server, cloud, or other environment, in accordance with an embodiment.

As illustrated in FIG. 7, in accordance with an embodiment, partitions can be configured as described above, including partition A 380, B 382 and N 384.

For example, partition A can include resource group A 386, together with a reference 387 to resource group template A 390, and/or other partition-specific applications or resources 388. Other partitions can similarly include references 402, 404, 406, 408 to one or more resource group templates as appropriate, such as resource group template B 394. Tenants associated with the different partitions, including in this example tenants A 410, B 412, and N 414, can access 420, 422, 424 their own partition and the application instance and resources therein.

In accordance with an embodiment, the networking subsystem can associate a partition ID with an execution context when a request arrives over a http/https, T3, or other protocol. For example, a partition may be configured to use a particular virtual target/virtual host. The networking subsystem can recognize that association and use it to associate requests that arrive via that virtual target/virtual host with that partition, which enables the system to create the required partition-specific instances of the resources during start-up and to operate on the correct partition-specific instances throughout the processing.

In accordance with an embodiment, the system can use similar functionality as described above, to support many thousands or millions of tenants within an application server, cloud or other environment, each of which can be associated with their own partition and its particular configuration and application server instance.

Channels

In accordance with an embodiment, the system can include support for channels, including use of a Partition-ValidatorService that, given certain keys, returns a partition ID to use. For example, servers can communicate using RJVMs and configured channels. In accordance with an embodiment, the system can provide one channel for use by all partitions, and provide each partition with its own dedicated, e.g., T3 connection. This reduces the need to create channels for each partition, since all partitions can share the same port.

Alternatively, in accordance with an embodiment, if multiple channels are configured, then a means of channel selection can be used. For example, all tenant traffic can have a channel name associated it, and a default channel can be used when partition ID is not available. If no partition and no channel are specified, then a default channel can be used. If no partition is specified, but a channel is, then the system can use the specified channel. If a partition is specified, but no channel is, then the partition ID can used to determine a suitable channel. If both a partition and a channel are specified, then the channel name can take precedence.

In accordance with an embodiment, when communication is provided between a client and a server, the client can make an initial request, the server can respond, and client is authenticated and validated. The calculated partition can then be set on the thread local, for subsequent use. On the server side, the DNS name as well as any client-provided credentials can be provided to the PartitionValidatorService, to obtain the partition ID. Once the valid partition ID is obtained, it can be set on the thread local of the executing thread, so that all subsequent operations are performed within the scope of the associated tenant.

In accordance with an embodiment, a client can provide a PROVIDER_URL (e.g., of the form t3://<host>:<port>) to look up the initial context, and to find the channel to connect to its peer. An RJVM layer can maintain a mapping of partition ID plus channels to open connections, to find the appropriate connection to use for a particular PROVIDER_URL. Assuming that the partition ID is available on the thread, the RJVM layer can find an existing connection associated with the tenant to service the request, or alternatively create a new connection.

Method of Supporting Multi-Tenancy

Figure 8:
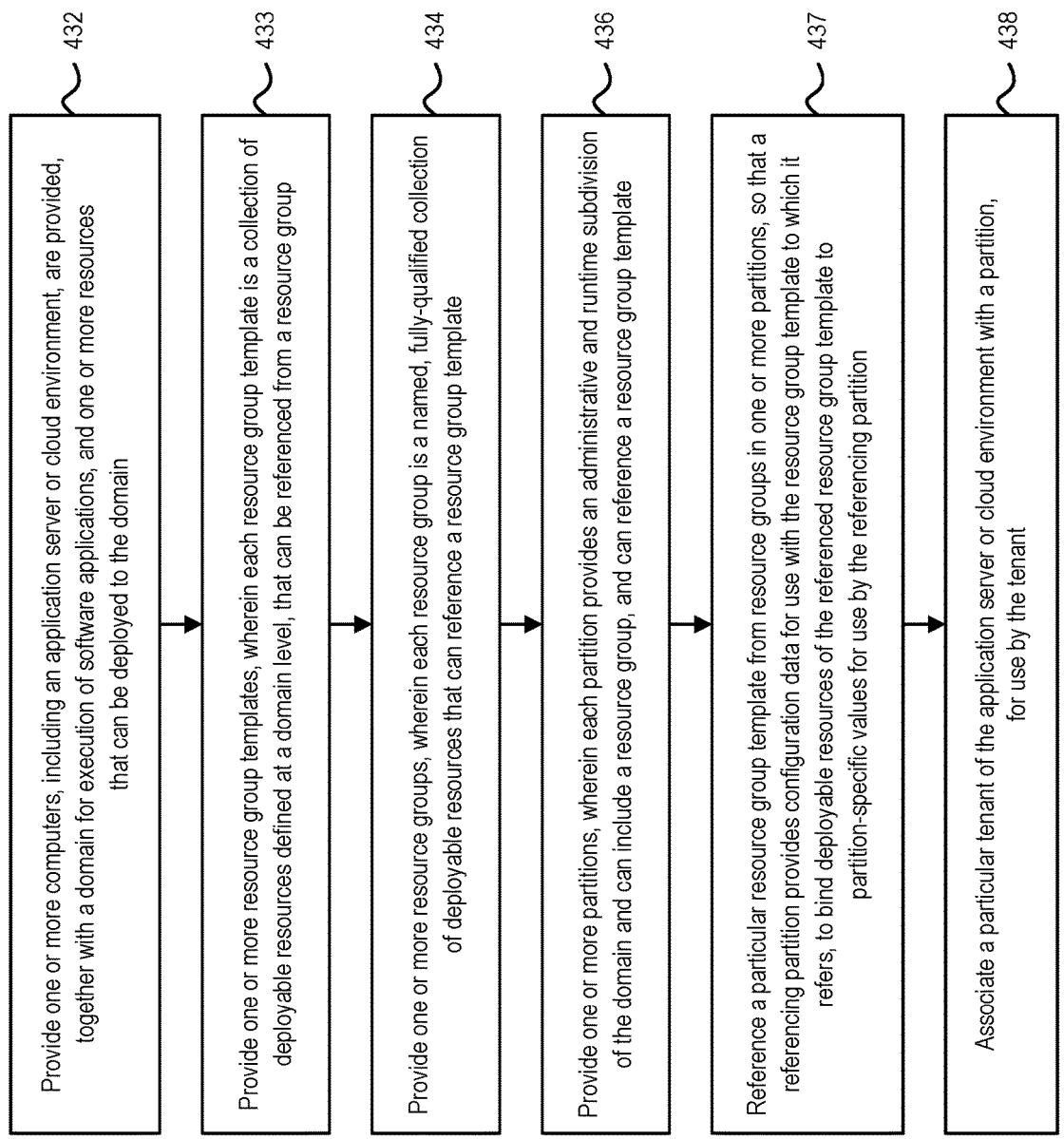
FIG. 8 illustrates a method of supporting multi-tenancy in an application server, cloud, or other environment, in accordance with an embodiment.

FIG. 8 illustrates a method of supporting multi-tenancy in an application server, cloud, or other environment, in accordance with an embodiment.

As illustrated in FIG. 8, in accordance with an embodiment, at step 432, one or more computers, including an application server or cloud environment, are provided, together with a domain for execution of software applications, and one or more resources that can be deployed to the domain.

At step 433, one or more resource group templates are provided, wherein each resource group template is a collection of deployable resources defined at a domain level, that can be referenced from a resource group.

At step 434, one or more resource groups are provided, wherein each resource group is a named, fully-qualified collection of deployable resources that can reference a resource group template.

At step 436, one or more partitions are provided, wherein each partition provides an administrative and runtime subdivision of the domain and can include a resource group, and can reference a resource group template.

At step 437, a particular resource group template is reference from resource groups in one or more partitions, so that a referencing partition provides configuration data for use with the resource group template to which it refers (but is otherwise not provided by the resource group template), to bind deployable resources of the referenced resource group template to partition-specific values for use by the referencing partition.

At step 438, a particular tenant of the application server or cloud environment is associated with a partition, for use by the tenant.

Partition Templates

In accordance with an embodiment, the system includes support for partition templates. A single partition type can be implemented such that all instantiations of the partition type share the same hardware resources and all application resources are satisfied using the same set of infrastructure components. Alternatively, different partition types can define different quality of service characteristics.

For example the instantiation of a "gold" or "production" partition can be used to target better hardware than a "bronze" or "development" partition, or to offer higher performance or other benefits, relative to their counterparts associated with other types of partition.

The ability to associated partitions with various quality of service levels benefits both tenant-aware applications, and non-tenant-aware applications, since they both are influenced by the characteristics of the underlying hardware and provider instances. Within a single partition instance, the quality of service for multiple deployed applications can be tuned by controlling work manager thread constraints, allowing one application deployed to a partition to perform better than other applications deployed to the same partition. A system administrator can associate quotas to control instantiation of partitions; for example limiting instances of "gold" partitions to only a few, while allowing a greater number of "bronze" partitions.

Portable Partitions

In accordance with an embodiment, the system includes support for portable partitions. A partition can be exported to a partition archive which contains the partition's configuration, resource groups, and resource group templates, and optionally application binaries and deployment plans, but not application runtime state nor application specific runtime configuration. This enables a partition to be exported from a first, source, domain, and imported to a second, target, domain, for example using import and export operations on a PartitionMBean.

Domain-specific dependencies may need to be updated after import, for example, target cluster, security realm, and virtual hosts for which external connections may need to be resolved and re-wired, either by having the elements already configured in the domain using the same names, or by updating the partition after importing it into the target domain. This provides finer-grained control of procedures such as T2P, since instead of migrating a full domain, a single partition can be migrated without requiring shutdown or restart of either domain.

After importing the partition, a system administrator may need to further update the partition configuration to make it valid, for example by updating partition properties; PDB information, or other resources in the partition's resource groups. When importing a partition archive into the target domain it is possible that the shared resource group template may already exist in the target domain. In this case the import operation can detect if the existing resource group template is identical to the one contained in the archive; if so, then the existing resource group template will be used, otherwise the import will fail and require the user to retry the import indicating which resource group template should be used.

Partition Migration

In accordance with an embodiment, the system includes support for partition migration. For example, each partition can be created on a cluster of application servers. A partition can be migrated from one cluster to another for a variety of reasons, for example affinity/anti-affinity of a partition to other resources that the partition depends on such as database; or to prevent downtime for the partition when the underlying runtime needs maintenance.

Partition-Aware REST Administration APIs

In accordance with an embodiment, the system includes support for partition-aware REST administration APIs. REST APIs can include resources for multi-tenant configuration and administration, including the generating of REST resources from bean interfaces and annotations. Other features of REST APIs can include role-based visibility (e.g., who can see what information); security (e.g., who can change what configuration); shared infrastructure with JMX; and means for providing client visibility to partition identity. The use of http/https protocols means that access can be enabled and controlled using standard firewalls and front-end host configurations, which is useful in a multi-tenant environment where a particular partition administrator may be permitted access to only a narrow slice of ports and channels supported by an application server domain. The visibility of administration REST resources can be restricted to those appropriate for a partition administrator, such that server configuration using these REST APIs can be restricted to configuration resources that are scoped to that partition.

Partition-Aware Diagnostics, Logging and Monitoring

In accordance with an embodiment, the system includes support for partition-aware diagnostics, logging, and monitoring, for example through the use of partition-scoped metrics harvesting; partition-scoped WebLogic Diagnostic Framework (WLDF) watch rules and notifications; partition-aware diagnostic image dumps; and partition-scoped logging.

Partition-aware diagnostic image capture can be initiated by a partition administrator or watch rules in a partition-scoped WLDF system resource. The system can present filtered views of diagnostic information, so that a partition-level administrator can monitor their part of the system, without being able to see information associated with other partitions.

In accordance with an embodiment, each partition-related log record can be tagged with a relevant partition ID. When a partition administrator uses a log viewer, the system can filter the entries to be displayed, revealing only those log records that the viewing administrator is authorized to see.

In accordance with an embodiment, to support monitoring, the system can create partition-specific runtime MBeans corresponding to the partition-specific resources it has started on behalf of each partition. As with logging, the data visible to a partition administrator can be limited to data from that administrator's partition, using security controls based on, for example, the partition ID of the resource as compared with the partition ID of the administrator requesting access.

Partition-Aware Tagging

In accordance with an embodiment, the system includes support for partition-aware tagging. Tagging provides a generic mechanism of assigning human-readable names to resources. In accordance with an embodiment, tags can be applied to a resource or a group of resources, to provide a flexible way for selecting resources, such as provider runtimes.

Partition-Aware Edit Sessions

In accordance with an embodiment, the system includes support for partition-aware edit sessions. For example, an edit session can be provided per partition. A partition administrator can change any of the partition-related configuration within a partition-specific edit session.

Configuration and Runtime Mbeans

In accordance with an embodiment, the system supports the use of JMX and managed bean (MBeans) for both configuration and runtime monitoring.

For example, in accordance with an embodiment, a hierarchy of configuration MBeans can be provided to match configuration elements in a configuration file (e.g., config.xml), including appropriate MBeans for <partition>, <resource-group-template>, and nested resource elements. An exemplary configuration MBean hierarchy can be:

```
Domain MBean
    ResourceGroupTemplate MBeans
        JDBCSystemResource MBeans
        JMSSystemResource MBeans
        AppDeployment MBeans
        ...
```

```
Partition MBeans
    JDBCSystemResourceOverride MBeans
    (Partition-specific resources) MBeans
        JDBCSystemResource MBeans
        JMSSystemResource MBeans
        AppDeployment MBeans
        ...
```

In accordance with an embodiment, each partition element can be defined using MBean APIs. In accordance with other embodiments, other MBeans and MBean APIs can be provided.

In accordance with an embodiment, a hierarchy of runtime MBeans can also be provided, including a ServerRuntimeMBean as the root node, which contains runtime MBeans for the application server, for example, clusters, server channels, JTA, and application resources. Partition-specific branches can be provided; for example, the JMSRuntimeMBean can contain partition-specific child MBeans for JMSConnectionRuntimeMBean, JMSServerRuntimeMBean, and JMSPooledConnectionRuntimeMBean):

```
ServerRuntime MBean
    PartitionRuntime MBeans
        JMSRuntime MBean
            JMSConnectionRuntime MBeans
            JMSServerRuntime MBeans
            JMSPooledConnectionRuntime MBeans
        JDBCServiceRuntime MBean
            JDBCDataSourceRuntime MBeans
            JDBCMultiDataSourceRuntime MBeans
            JDBCDriverRuntime MBeans
        ApplicationRuntime MBeans
            ComponentRuntime MBeans (component specific)
            WorkManagerRuntime MBeans
        LibraryRuntime MBean
        WLDFRuntime MBean
            WLDFAccessRuntime MBean
            ...
        MailSessionRuntime MBeans
        PersistentStoreRuntime MBeans
            PersistentStoreConnectionRuntime MBeans
        ConnectorServiceRuntime MBean
            ConnectorComponentRuntime MBeans
        PathServiceRuntime MBean
            PSAssemblyRuntime MBeans
        SAFRuntime MBean
    SAFAgentRuntime MBeans
```

In accordance with an embodiment, runtime MBeans for partition-specific resources can also be provided in a partition-specific hierarchy, rather than the global hierarchy at the ServerRuntime MBean level, which allows for partition-specific monitoring and statistics. The PartitionRuntimeMBean can contain component-specific MBeans for subsystems, such as JMS, JDBC, Deployment, WLDF, Coherence, and Connectors.

Example Configuration—SaaS Use Case

An exemplary configuration file (e.g., config.xml) for the MedRec application example is provided below, including a resource-group-template with multiple applications and resources, and having two partitions—in this example one partition for BayLand Urgent Care, and another for Valley Health. Each partition defines a resource-group that inherits the applications and resources from the template, and also contains a PDB information that is specific to that partition.

```xml
<domain>
    <resource-group-template>
        <name>MedRecResourceTemplate</name>
        <app-deployment>
            <name>medrec</name>
            ...
        </app-deployment>
        <app-deployment>
            <name>physician</name>
            ...
        </app-deployment>
        <app-deployment>
            <name>browser-starter</name>
            ...
        </app-deployment>
        <app-deployment>
            <name>SamplesSearchWebApp</name>
            ...
        </app-deployment>
        <jms-server>
            <name>MedRecJMSServer</name>
        </jms-server>
        <mail-session>
            <name>mail/MedRecMailSession</name>
            <jndi-name>mail/MedRecMailSession</jndi-name>
            <properties>mail.user=joe;mail.host=mail.mycompany.com</properties>
        </mail-session>
        <jms-system-resource>
            <name>MedRec-jms</name>
            <sub-deployment>
                <name>MedRecJMSServer</name>
            </sub-deployment>
            <descriptor-file-name>jms/MedRec-jms.xml</descriptor-file-name>
        </jms-system-resource>
        <jdbc-system-resource>
            <name>MedRecGlobalDataSourceXAc/name>
            <descriptor-file-name>jdbc/MedRecGlobalDataSourceXA-9669-jdbc.xml</descriptor-file-name>
        </jdbc-system-resource>
        <saf-agent>
            <name>WsrmAgent</name>
            <service-type>Both</service-type>
        </saf-agent>
    </resource-group-template>
    <partition>
        <name>BaylandUrgentCare</name>
        <resource-group>
            <name>BayLandMedRec</name>
            <resource-group-template>MedRecResourceTemplate</resource-group-template>
        </resource-group>
        <partition-pdb-info>
            <name>MedrecGlobalDataSourceXA</name>
            <data-source-name>MedRecGlobalDataSourceXA</data-source-name>
            <url>jdbc:oracle:thin:@(DESCRIPTION(ADDRESS_LIST=(ADDRESS=(PROTOCOL=TCI HOST=adc2111020.us.oracle.com)(PORT=5521)))(CONNECT_DATA=(SERVICE_NAME=cdb1_pdb1.regress.rdbms.dev.us.acle.com)))</url>
            <user>BUuser</user>
            <password-encrypted>{AES}xyz</password-encrypted>
        </partition-pdb-info>
    </partition>
    <partition>
        <name>ValleyHealth</name>
        <resource-group>
            <name>ValleyHealthMedRec</name>
            <resource-group-template>MedRecResourceTemplate</resource-group-template>
        </resource-group>
        <partition-pdb-info>
            <name>MedrecGlobalDataSourceXA</name>
            <data-source-name>MedRecGlobalDataSourceXA</data-source-name>
            <url>jdbc:oracle:thin:@(DESCRIPTION=(ADDRESS_LIST=(ADDRESS=(PROTOCOL=TCI HOST=adc2111020.us.oracle.com)(PORT=5521)))(CONNECT_DATA=(SERVICE_NAME=cdb1_pdb2.regress.rdbms.dev.us.acle.com)))
```

```
            </url>
            <user>VHuser</user>
            <password-encrypted>{AES}abc</password-encrypted>
        </partition-pdb-info>
    </partition>
</domain>
```

Example Configuration—PaaS Use Case

Another exemplary configuration file (e.g., config.xml) is provided below, in this example illustrating a configuration for resource group elements with partition-specific applications and resources. In this example, two partitions are configured, including one partition for a HR department, and another for a Finance department. Each partition defines a resource group that defines the applications that are specific to that partition. In this example there is no resource group template specified, since in this use case there are no multi-tenant applications shared between the partitions.

```
<domain>
    <partition>
        <name>HR</name>
        <resource-group>
            <name>HR Apps and Resources</name>
            <app-deployment>
                <name>HR App</name>
                ...
            </app-deployment>
            <jdbc-system-resource>
                <name>HR DataSource</name>
                <descriptor-file-name>jdbc/HR-Datasource-jdbc.xml</descriptor-file-name>
            </jdbc-system-resource>
        </resource-group>
    </partition>
    <partition>
        <name>Finance</name>
        <resource-group>
            <name>Finance Apps and Resources</name>
            <app-deployment>
                <name>Finance App</name>
                ...
            </app-deployment>
            <jdbc-system-resource>
                <name>Finance DataSource</name>
                <descriptor-file-name>jdbc/Finance-Datasource-jdbc.xml</descriptor-file-name>
            </jdbc-system-resource>
        </resource-group>
    </partition>
</domain>
```

In accordance with an embodiment, a configuration can overridden using a deployment plan. An example configuration is provided below which illustrates a configuration for the MedRec application for a resource-group-template, including overrides for a deployment plan file name element. In this example there are again two partitions, one for BayLand Urgent Care, and another for Valley Health, each of which defines an application that overrides the resource group template deployment plan.

```
<domain>
    <resource-group-template>
        <name>MedRecResourceTemplate</name>
        <app-deployment>
            <name>medrec</name>
            <source-path>/apps/medrec/medrec.ear</plan-path>
            <plan-path>/apps/medrec/plan.xml</plan-path>
        </app-deployment>
```

```xml
        . . .
    </resource-group-template>
    <partition>
        <name>BaylandUrgentCare</name>
        <resource-group>
            <name>BayLandMedRec</name>
            <resource-group-template>MedRecResourceTemplate</resource-group-template>
            <app-deployment>
                <name>medrec</name>
                <plan-path>/apps/medrec/bay-land-plan.xml</plan-path>
            </app-deployment>
        </resource-group>
        . . .
    </partition>
    <partition>
        <name>ValleyHealth</name>
        <resource-group>
            <name>ValleyHealthMedRec</name>
            <resource-group-template>MedRecResourceTemplate</resource-group-template>
            <app-deployment>
                <name>medrec</name>
                <plan-path>/apps/medrec/valley-health-plan.xml</plan-path>
            </app-deployment>
        </resource-group>
        . . .
    </partition>
</domain>
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, although for purposes of illustration many of the embodiments described above describe the use of multi-tenancy in WebLogic Server (WLS), multi-tenant WLS (WLS-MT), or Fusion Applications environments, similar functionality and features can be used with other application server, enterprise application, cloud, or other environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting multi-tenancy in an application server, a cloud environment, or other environment, comprising:
    a computer that includes one or more processors and an application server, a cloud environment, or other environment executing thereon, and having a domain configuration that is used at runtime to define a domain for execution of software applications, and a plurality of resources accessible within the domain and adapted for use by the software applications;
    wherein the system operates at runtime to define a plurality of partitions of the domain, including wherein:
        each partition, of the plurality of partitions, is associated with a partition identifier that identifies the partition; and
        each partition, of the plurality of partitions, provides a subdivision of the domain for execution of the software applications and use of the plurality of resources within a context of the partition; and
    wherein each partition, of the plurality of partitions, is associated with a virtual target associated with the partition, and wherein upon a request received from a client directed to a particular virtual target, the system:
        determines a particular partition associated with the received request, and a particular partition identifier, and stores the particular partition identifier in a request execution context; and
        routes the received request to the particular partition, for use by the software applications associated with the particular partition.

2. The system of claim 1, wherein the system is provided within a cloud environment that enables one or more partitions to be associated with a tenant for use by the tenant;
    wherein a partition identifier is associated with a tenant identifier; and wherein a tenant-aware application enables use of the tenant identifier to handle multiple tenants that are using a single instance of the tenant-aware application.

3. The system of claim 1, wherein:
a first partition is associated with a first partition identifier, and a first plurality of resources associated with the first partition, and is accessible by clients communicating requests to a first virtual target; and
a second partition is associated with a second partition identifier, and a second plurality of resources associated with the second partition, and is accessible by clients communicating requests to a second virtual target.

4. The system of claim 1, wherein the system includes a networking layer that associates incoming requests with partition identifiers based on a request Uniform Resource Locator (URL), and wherein the networking layer determines a target partition identifier for the received request, and adds the determined target partition identifier to the received request's execution context.

5. The system of claim 1, wherein the system includes support for channels, including a channel for use by all partitions, and a dedicated channel for each partition of the plurality of partitions, and wherein if a partition is specified, then the partition identifier is used to determine a suitable channel.

6. A method for supporting multi-tenancy in an application server, a cloud environment, or other environment, comprising:
providing, at a computer that includes one or more processors and an application server, a cloud environment, or other environment executing thereon, and having a domain configuration that is used at runtime to define a domain for execution of software applications, and a plurality of resources accessible within the domain and adapted for use by the software applications;
wherein a system operates at runtime to define a plurality of partitions of the domain, including wherein:
each partition, of the plurality of partitions, is associated with a partition identifier that identifies the partition; and
each partition, of the plurality of partitions, provides a subdivision of the domain for execution of the software applications and use of the plurality of resources within a context of the partition; and
wherein each partition, of the plurality of partitions, is associated with a virtual target associated with the partition, and wherein upon a request received from a client directed to a particular virtual target, the system:
determines a particular partition associated with the received request, and a particular partition identifier, and stores the particular partition identifier in a request execution context; and
routes the received request to the particular partition, for use by the software applications associated with the particular partition.

7. The method of claim 6, wherein the system is provided within a cloud environment that enables one or more partitions to be associated with a tenant for use by the tenant;
wherein a partition identifier is associated with a tenant identifier; and
wherein a tenant-aware application enables use of the tenant identifier to handle multiple tenants that are using a single instance of the tenant-aware application.

8. The method of claim 6, wherein:
a first partition is associated with a first partition identifier, and a first plurality of resources associated with the first partition, and is accessible by clients communicating requests to a first virtual target; and
a second partition is associated with a second partition identifier, and a second plurality of resources associated with the second partition, and is accessible by clients communicating requests to a second virtual target.

9. The method of claim 6, wherein the system includes a networking layer that associates incoming requests with partition identifiers based on a request Uniform Resource Locator (URL), and wherein the networking layer determines a target partition identifier for the received request, and adds the determined target partition identifier to the received request's execution context.

10. The method of claim 6, wherein the system includes support for channels, including a channel for use by all partitions, and a dedicated channel for each partition of the plurality of partitions, and wherein if a partition is specified, then the partition identifier is used to determine a suitable channel.

11. A non-transitory computer readable storage medium, including instructions stored thereon which when read and executed by one or more computers cause the one or more computers to perform a method comprising:
providing, at a computer that includes one or more processors and an application server, a cloud environment, or other environment executing thereon, and having a domain configuration that is used at runtime to define a domain for execution of software applications, and a plurality of resources accessible within the domain and adapted for use by the software applications;
wherein a system operates at runtime to define a plurality of partitions of the domain, including wherein:
each partition, of the plurality of partitions, is associated with a partition identifier that identifies the partition; and
each partition, of the plurality of partitions, provides a subdivision of the domain for execution of the software applications and use of the plurality of resources within a context of the partition; and
wherein each partition, of the plurality of partitions, is associated with a virtual target associated with the partition, and wherein upon a request received from a client directed to a particular virtual target, the system:
determines a particular partition associated with the received request, and a particular partition identifier, and stores the particular partition identifier in a request execution context; and
routes the received request to the particular partition, for use by the software applications associated with the particular partition.

12. The non-transitory computer readable storage medium of claim 11, wherein the system is provided within a cloud environment that enables one or more partitions to be associated with a tenant for use by the tenant;
wherein a partition identifier is associated with a tenant identifier; and
wherein a tenant-aware application enables use of the tenant identifier to handle multiple tenants that are using a single instance of the tenant-aware application.

13. The non-transitory computer readable storage medium of claim 11, wherein:
a first partition is associated with a first partition identifier, and a first plurality of resources associated with the first partition, and is accessible by clients communicating requests to a first virtual target; and a second partition is associated with a second partition identifier, and a second plurality of resources associated with the second partition, and is accessible by clients communicating requests to a second virtual target.

14. The non-transitory computer readable storage medium of claim 11, wherein the system includes a networking layer that associates incoming requests with partition identifiers based on a request Uniform Resource Locator (URL), and wherein the networking layer determines a target partition identifier for the received request, and adds the determined target partition identifier to the received request's execution context.

15. The non-transitory computer readable storage medium of claim 11, wherein the system includes support for channels, including a channel for use by all partitions, and a dedicated channel for each partition of the plurality of partitions, and wherein if a partition is specified, then the partition identifier is used to determine a suitable channel.

\* \* \* \* \*

UNITED STATES PATENT AND TRADEMARK OFFICE
CERTIFICATE OF CORRECTION

| | | |
|---|---|---|
| PATENT NO. | : 11,343,200 B2 | Page 1 of 1 |
| APPLICATION NO. | : 16/918631 | |
| DATED | : May 24, 2022 | |
| INVENTOR(S) | : Mordani et al. | |

It is certified that error appears in the above-identified patent and that said Letters Patent is hereby corrected as shown below:

In the Specification

In Columns 21-22, Line 36, delete "XAc/name>" and insert -- XA/name> --, therefor.

In Columns 21-22, Line 55, delete "(ADDRESS" and insert -- =(ADDRESS --, therefor.

Signed and Sealed this
Twenty-ninth Day of November, 2022

*Katherine Kelly Vidal*

Katherine Kelly Vidal
*Director of the United States Patent and Trademark Office*